United States Patent [19]

Brandestini

[11] 4,387,597
[45] Jun. 14, 1983

[54] BEAMFORMING APPARATUS AND METHOD FOR ULTRASONIC IMAGING SYSTEMS

[75] Inventor: Marco A. Brandestini, Seattle, Wash.

[73] Assignee: Advanced Technology Laboratories, Inc., Bellevue, Wash.

[21] Appl. No.: 214,422

[22] Filed: Dec. 8, 1980

[51] Int. Cl.$^3$ .............................................. G01N 29/00
[52] U.S. Cl. ...................................... 73/626; 128/660
[58] Field of Search ................. 73/626, 625; 128/660; 367/103

[56] References Cited

U.S. PATENT DOCUMENTS

| | | | |
|---|---|---|---|
| 3,481,186 | 12/1969 | Cellitti | 73/626 |
| 3,899,767 | 8/1975 | Jones | 340/3 R |
| 3,950,723 | 4/1976 | Gilmour | 367/103 |
| 3,953,825 | 4/1976 | Kiwo et al. | 73/626 |
| 3,967,233 | 6/1976 | Maguer et al. | 367/103 |
| 4,005,382 | 1/1977 | Beaver | 340/1 R |
| 4,019,169 | 4/1977 | Takamizawa | 340/1 R |
| 4,140,022 | 2/1979 | Maslak | 73/626 |
| 4,155,258 | 5/1979 | Engeler et al. | 73/626 |
| 4,155,260 | 5/1979 | Engeler et al. | 73/626 |
| 4,165,647 | 8/1979 | Collins | 73/603 |
| 4,200,923 | 4/1980 | Thies | 367/123 |
| 4,276,779 | 7/1981 | Davis, Jr. | 73/626 |
| 4,328,707 | 5/1982 | Clement et al. | 73/626 X |

FOREIGN PATENT DOCUMENTS 2429436 1/1980 France .
2005833 4/1977 United Kingdom .

OTHER PUBLICATIONS

A General Treatment of Modulation Scanning in Acoustic Parts 1 and 2, by Vogle, Ultrasonic, 1971, Jul. and Oct. U.K.
Curtis et al., "Digital Beam Forming for Sonar Systems", ICC Proc., vol. 127, pp. 257-265, Aug. 1980.
Johnson, "Phased-Array Beam Steering by Multiplex Sampling", Proceedings of the IEEE, pp. 1801-1811, Nov. 1968.
Pasupathy et al., "Optimum Active Array Processing Structure and Space-Time Factorability", IEEE Transactions On Aerospace and Electronic Systems, pp. 770-777, 11/74.
Brandestini et al., Blood Flow Imaging Using a Discrete-Time Frequency Meter, IEEE Proceedings, 1978 Ultrasonics Symposium, pp. 348-352 (1978).
Burckhardt et al., A Simplified Ultrasound Phased Array Scanner, appearing in Echocardiology, Lancee (ed.), pp. 385-393 (1979).

*Primary Examiner*—Anthony V. Ciarlante
*Assistant Examiner*—David V. Carlson
*Attorney, Agent, or Firm*—Christensen, O'Connor, Johnson & Kindness

[57] ABSTRACT

A scanner includes a scan head having a linear array of transducers Xn, and a transmitter 106 which excites the transducers in response to transmit signals TRn from a reference generator 110 so that the transducers emit a plurality of successive bursts of ultrasonic energy, each burst producing a transmitted beam which is steered and focused along a radially-extending scan line. To effect received beam steering and focusing, received signals Sn from the transducers are supplied to a processor 112 along with associated in-phase binary reference signals bn(R) and quadrature binary reference signals bn(I). The received signal is multiplied by a reference signal and the product is integrated for a specific time duration whose time occurrence is used to steer and focus the beam. Processor 112 is responsive to WRITE SELECT, READ SELECT and SAMPLE signals from reference generator 110 to correlate each signal Sn with its associated reference signals during a plurality of successive resolution windows, each of which corresponds to a distinct incremental area along a scan line, so as to provide in-phase and quadrature output signals Re and Im each representing a response of the array to reflections from successive incremental areas along a scan line. Signals Re and Im are combined by processors 114 and 116 to develop output signals A and ø representing, respectively, the amplitude and phase of returns from successive incremental areas along a scan line. Information for transmitted and received beam steering and focusing is stored in a phase pattern memory 118A, and extracted therefrom by a controller 118 in a predetermined order and supplied to reference generator 110.

25 Claims, 15 Drawing Figures

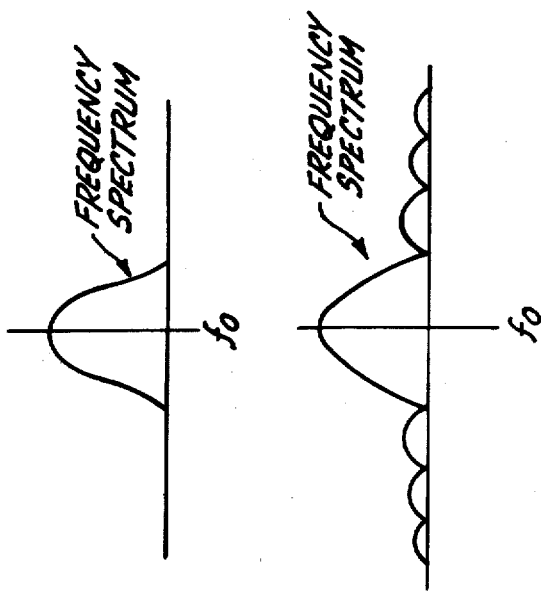
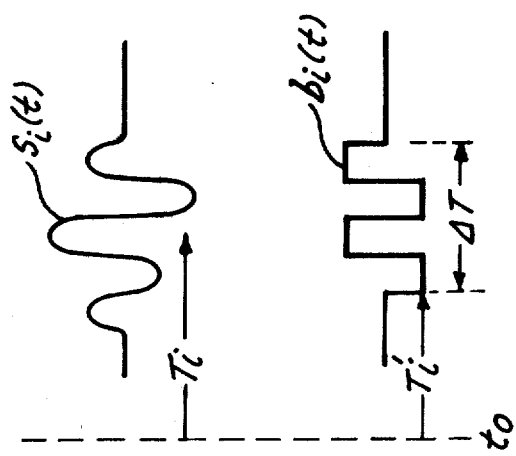
Fig. 1A.

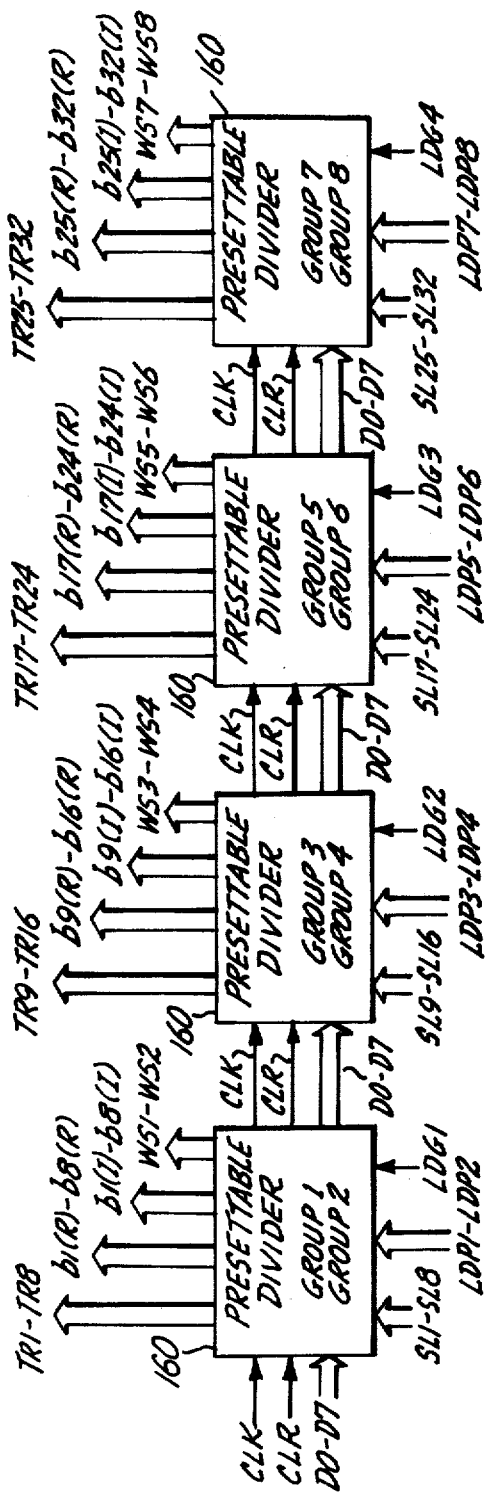
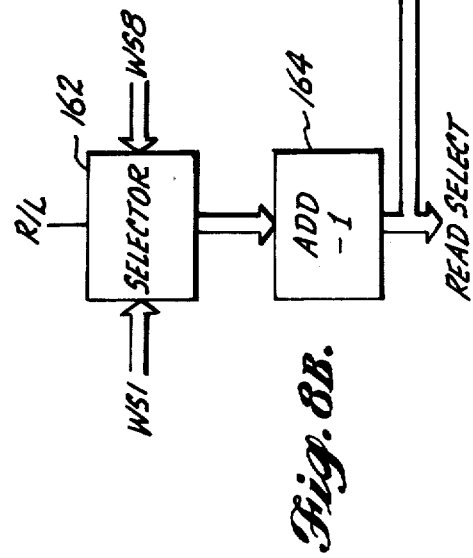
Fig. 8A.
Fig. 8B.

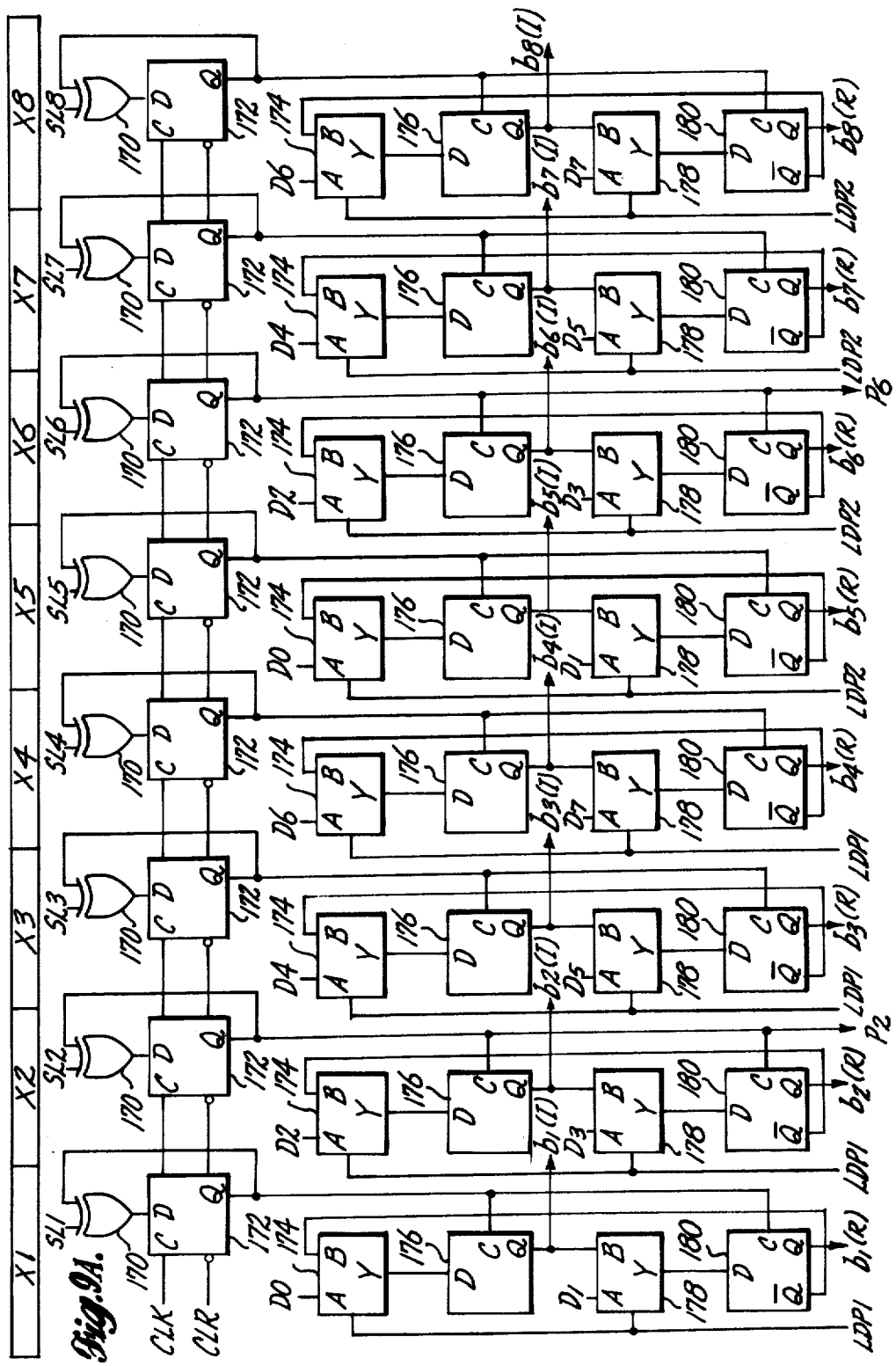

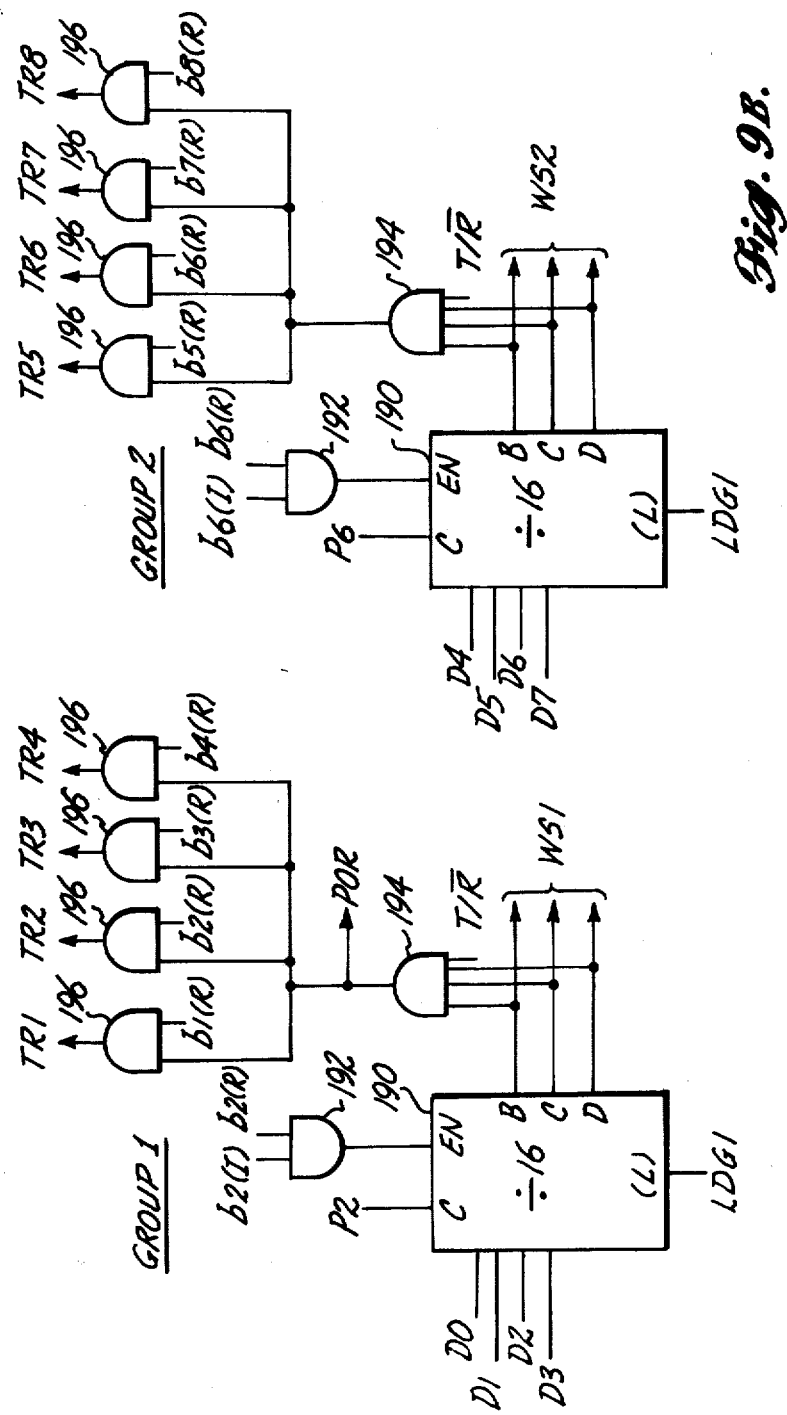

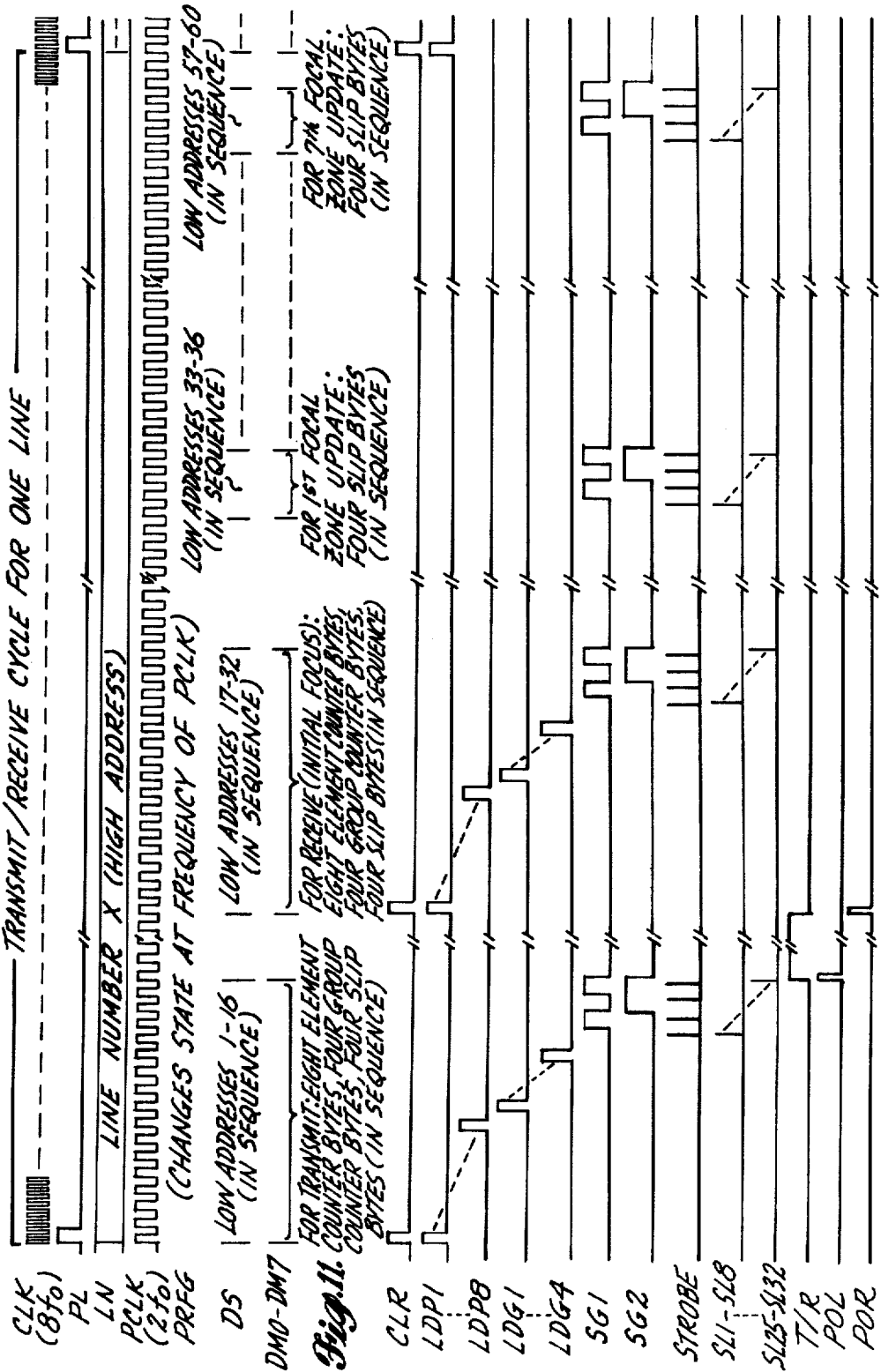

BEAMFORMING APPARATUS AND METHOD FOR ULTRASONIC IMAGING SYSTEMS

FIELD OF THE INVENTION

This invention generally relates to ultrasonic imaging systems, and, more particularly, to an apparatus and method, useful in such imaging systems, for steering and focusing a beam of ultrasonic energy.

BACKGROUND OF THE INVENTION

Ultrasonic imaging systems are known to the prior art for providing real-time, cross-sectional images of human cardiac, abdominal and peripheral vascular structure that are of substantial diagnostic value. While various types of image formats have been provided, one of the more useful image formats from a diagnostic standpoint is the two-dimensional sector image which comprises an image of those body tissues located within a substantially planar sector. To develop the information required for a two-dimensional sector image, the ultrasonic imaging system includes a scanner which transmits a plurality of bursts of ultrasonic enery which propagate outwardly from a common point of origin in a plurality of angularly spaced-apart, radially-directed beams, and which detects, for each beam, return or echo pulses that occur when the associated burst of ultrasonic energy is scattered or reflected by tissue interfaces that lie in the beam. Since the time which elapses between the transmission of each ultrasonic energy burst and reception of any associated return pulse is related to the distance between the tissue interface causing the return pulse and the common point of origin, the return pulses can be processed to provide the two-dimensional sector image.

Such scanners may provide either a mechanical or an electronic scan of the sector. Mechanical scanners can be visualized as including a scan head which is maintained in contact with the skin of the body and which contains a continuously-rotating or oscillating ultrasonic transducer that is enabled for signal transmission and reception while the transducer is traversing a desired sectorial angle. When enabled; the transducer is caused to transmit a burst of ultrasonic energy and receive any associated return pulses at each of a plurality of incremental angular positions (or scan lines) thereof. The output signals provided by such mechanical scanners are in analog form and are referenced to a polar coordinate system wherein: the transmitted ultrasonic energy can be mathematically modeled as a point source that is located at the origin of the polar coordinate system; the value of the angular or azimuthal coordinate, $\theta$ expresses the direction of any transmitted ultrasonic energy burst and its associated return pulses (or, the relative angular position of any scan line); and, the value of the radial or axial coordinate, r, expresses the radial distance or range between the point of origin and the tissue interfaces causing the return pulses along any scan line.

In order that the output signals from the scanner may be visually displayed, in real-time, by a conventional video display apparatus whose scan is based on a Cartesian coordinate system and whose scanning rate may differ from that of the scanner, the output signals from the scanner are buffered and converted to Cartesian coordinates by a scan converter such as that described and claimed in U.S. Pat. No. 4,214,269, Parker et al., REAL TIME DIGITAL SCAN CONVERTER, issued July 22, 1980 to the assignee of the present invention.

While mechanical scanners provide acceptable operation and in fact are used in the majority of medical ultrasonic imaging systems providing two-dimensional sector images, they are subject to certain disadvantages. For example, the mechanical components of the scanner experience wear during operation with resultant degradation in image quality and eventual failure. As another example, the ultrasonic energy transmitted by the single transducer can only be focused within a limited range. As yet another example, the point of origin of the scan lines in a mechanical scanner lies at the transducer pivot and thus behind the interface between the scan head and the skin, so that the scanner must be carefully designed to minimize the distance between the point of origin and the skin.

In order to overcome the noted disadvantages of mechanical scanners, electronic or "phased array" scanners have been proposed which also operate to provide output signals in polar coordinate format and in analog or digital form for scan conversion and resultant display. Such electronic scanners include no moving mechanical components and theoretically can provide excellent axial and azimuthal resolution, dynamic focusing along each scan line, a common point of origin of the scan lines which is at the skin, and flexible beamforming which can be used to develop a wide variety of sector formats and other image formats. As will be apparent from the ensuing discussion, however, the electronic scanners heretofore known have been difficult and costly to implement in any practical form which provides acceptable image quality, and therefore have not found widespread acceptance.

Referring now to FIG. 1, the functional representation therein of a prior art electronic scanner includes a plurality of identical ultrasonic transducers X1-X12 arranged in a linear array, with each transducer being equally spaced from its adjacent transducers in the array. Each transducer is of the type which is capable of substantially omnidirectional ultrasonic energy transmission and reception at a frequency $f_0$, with ultrasonic energy from and to the back side of each transducer being absorbed (by means not illustrated). In order to scan an object point in front of the array which is located at infinity and which lies along a line perpendicular to the array ($\theta = 0$), electrical pulses are simultaneously applied to the transducers, resulting in the simultaneous transmission of acoustic pulses therefrom which combine to form a transmitted beam of ultrasonic energy having substantially the same characteristics as a beam transmitted by a single ultrasonic transducer whose dimensions, or aperture, are the same as those of the array. In order to steer the scan to an object point which is located at infinity and which lies on a scan line angularly disposed by an azimuthal angle $\theta$, the electrical pulses applied to the transducers must have a predetermined timing relationship to each other that results in the propagation of a substantially planar acoustic wave front along the desired scan line.

Return pulses from any object point at infinity will combine in a substantially planar acoustic wave front propagating toward the array along the scan line so as to result in electrical signals being produced by the transducers that have substantially the same timing relationship to each other as the electrical pulses used to excite the transducers. The electrical signals representing return pulses accordingly must be processed in an appropriate manner so that simultaneous detection of all return pulses from a given object point can be made.

It can be shown that, for an object point located at infinity and lying along a scan line at any angle $\theta$, the predetermined timing relationship between the "transmitted" electrical pulses and between the "received" electrical signals is linear. For an object point closer to the array, this linear relationship must be modified so as to result in the transmission and reception of beams having substantially circular acoustic wave fronts that converge about the object point.

Implementation of the aforementioned timing relationships is illustrated in FIG. 1 by a common node 10 that is coupled to each of the transducers X1-X12 through a corresponding one of a plurality of bidirectional parallel delay elements DL1-DL12, with the delay afforded by each delay element between a signal on common node 10 and its associated transducer, and vice-versa, being selectively adjustable. For an object point OP located at the right of the array and lying at a distance less than infinity from the array, it will be seen that, as schematically represented in FIG. 1, the application of a transmit signal T (comprising a burst of pulses at frequency $f_0$) to common node 10 results in transducer X12, transducer X11, and the remaining transducers in the array being excited in succession, due to the increasing amounts of delay afforded by successive delay lines DL12, DL11, etc. The resultant acoustic pulses from the transducers combine in a beam having a substantially circular acoustic wave front WF which converges about object point OP. Likewise, returns of the transmitted ultrasonic energy from object point OP combine to form a substantially circular acoustic wave front identical in form to wave front WF which propagates back toward the array and which reaches, in succession, transducer X1, transducer X2, and so forth down the array to transducer X12. It will be noted that the same delays given to the transmit signal T by delay elements DL1-DL12 are also given to the received electrical signals from transducers X1-X12, so that the received electrical signals all arrive at common node 10 at substantially the same time. Accordingly, there appears on common node 10 a receive signal R representing all returns of the transmitted ultrasonic energy from object point OP. It can be appreciated that, through selective adjustment of the delays afforded by delay elements DL1-DL12, the transmitted and received beams of the scanner can be steered to any desired azimuthal angle and can be focused to any desired range at each azimuthal angle.

For beam transmission, digital timing circuitry is conventionally used, rather than the delay elements illustrated in FIG. 1, to generate the electrical signals applied to the transducers of the array. In many cases, precise focusing of the transmitted beam is not necessary, resulting in simplification of the digital timing circuitry. The received electrical signals from the transducers, being analog in nature and of wide dynamic range, are not so easily treated and it heretofore has been thought necessary to utilize some sort of delay element or elements to effect processing and detection of the received electrical signals. In a straightforward implementation of the parallel approach illustrated in FIG. 1, each delay element includes an input (which is coupled to its associated transducer) and a plurality of outputs or taps, with each delay element functioning to provide signals on its taps which are delayed from the signal on its input by predetermined and different amounts. In order to effect steering and focusing of the received beam, a switching apparatus is selectively controlled to connect a tap on each delay element to a common summing junction. For a typical array including thirty-two transducer elements operating at a nominal frequency of 2.5 MHz, it can be shown that in order to obtain phase coherence of the received electrical signals that is within $\lambda/8$ (at frequency $f_0$), approximately 160 taps and a maximum delay of approximately eight microseconds are required for each delay element. It is difficult, and accordingly expensive, to fabricate such electrical delay elements which can provide acceptable operation, given the large number of taps, the high frequency of operation, and the maximum delay that is required. The switching apparatus used to connect the taps of the delay elements to the common summing junction is also necessarily complex and expensive. For these reasons, electronic scanners following a straightforward implementation of the parallel approach in FIG. 1 have not been commercially implemented.

A number of approaches have been taken in the prior art to reduce the number of taps required for each delay element and to reduce the maximum delay that must be afforded thereby.

One of these approaches can be seen in U.S. Pat. No. 4,005,382, Beaver, in which it is recognized that although there is a maximum delay that must be provided in detection of the received signals (e.g., the delay that is required between the received electrical signals at the rightmost transducer and the received electrical signal at the leftmost transducer when the ultrasonic beam is steered to either the far-right or the far-left), the delay between the received electrical signals from adjacent transducers is much less. Accordingly, the scanner in the Beaver patent includes a plurality of short adjustable delay elements, each associated with a transducer of the array, and a plurality of selectively-actuable switches for interconnecting adjacent ones of the delay elements. The switches function to connect the input of a given delay element to the output of the adjacent delay element, to connect the output of a given delay element to the input of the adjacent delay element, or to connect the output of a given delay element to the output of the adjacent delay element. To give an example of the operation of this electronic scanner, let it be assumed that the received beam is to be steered and focused to the right of the array. In such a case, the switches are actuated so that the output of the rightmost delay element is connected to the input of the adjacent delay element to the left in the array, the output of the adjacent delay element is connected to the input of the next-adjacent delay element to the left in the array, and so forth, resulting in a transverse "pipeline" structure. The received electrical signal from the rightmost transducer is therefore delayed by its associated delay element, and summed with the received electrical signal from the adjacent transducer to the left in the array. The thus-summed pulses are then delayed in the delay element associated with the next adjacent transducer, and then summed with the received electrical signal from the next-adjacent transducer, and so forth. An electrical signal corresponding to the received acoustic wave front therefore passes transversely across the array until the contribution to that signal from the leftmost transducer has been made. For beam steering and focusing to object points lying directly ahead of the array and closer than infinity, the switches are actuated so that the received electrical signal from the right centermost element in the array passes to the right in the array through succeeding delay elements and the received electrical signal from the left centermost element in the array passes to the left in the array through successive delay elements.

While the approach taken in the Beaver patent significantly reduces the length or maximum delay of each delay element and the number of discrete delay values that must be provided in each delay element, it is subject to serious disadvantages. For example, if the beam is steered and focused to either side of the array, the received electrical signals from the transducers on that side of the array must pass through a greater number of switches and delay elements than the received electrical signals from the transducers on the other side of the array. Since the received electrical signal from each transducer accordingly passes through a different number of delay elements, the received electrical signals are distorted with respect to each other. To minimize this distortion, it has been found necessary to limit the number of transducers used in the array, with a resultant loss of lateral resolution. As another example, the fact that two signals must be developed for object points directly ahead of the array and closer than infinity (i.e., signals passing to the right and to the left in the array) result in a loss of image quality for such object points.

Another approach is found in the electronic scanner taught in U.S. Pat. No. 4,019,169, Takamizawa. In this patent, each delay element in the parallel approach illustrated in FIG. 1 comprises a plurality of capacitors, a plurality of write switches for coupling the received electrical signal from the associated transducer to the capacitors, and a plurality of read switches for coupling the capacitors to a common summing junction for all of the delay elements. The write switches are successively actuated at a frequency (e.g., 8 MHz) so as to sample successive amplitude levels of the received electrical signal from the associated transducer and to accordingly store the sampled signal levels on the capacitors. The capacitors are then read by successive actuation of the read switches, at a time corresponding to the desired delay. While the approach taken in the Takamizawa patent is meritorious if the sampling rate can be made high enough, the fact remains that the sampling rate is limited by the operational speeds of currently-available switching transistors. Accordingly, the received electrical signal stored in the capacitors is distorted and loss of image quality results.

A digital version of the electronic scanner in the Takamizawa patent has also been proposed, wherein each delay element includes an analog-to-digital converter, a random access memory (RAM), and a digital-to-analog converter. The received electrical signal from each transducer is digitized by the analog-to-digital converter, stored in appropriate locations in the RAM, and read from the RAM at the appropriate delay time and reconverted to analog form by the digital-to-analog converter. In order to reduce the amount of digital data that is stored in the RAM, a limited number (e.g., sixteen) of amplitude levels are used to digitize the received electrical signal from the transducer, thereby resulting in coarse quantization and consequent loss of image quality.

In U.S. Pat. No. 4,155,260, Engeler et al., another approach is taught which avoids the problems associated with the high signal processing rate taught in the Takamizawa patent. In this patent, each received electrical signal is synchronously demodulated by mixing the output signal from the transducer with a reference signal that preferably has a frequency equal to that of the transmitted ultrasonic energy and that has a predetermined phase relationship to the output signal from the transducer. The mixer output is filtered and the resultant filtered signal is applied to a delay element, with the outputs of the delay elements for all of the transducers being summed to provide the desired output signal. Since the filtered signal is at a lower frequency than the received electrical signal from the transducer, relatively inexpensive and available charge-coupled devices can be used in each delay element, with the charge-coupled devices being arranged in a manner similar to an analog shift register in which the filtered signal passes through the charge-coupled devices from the input of the delay element to the output thereof at a rate determined by a clock signal applied to the charge-coupled devices. Although the approach taken in the Engeler et al. patent is advantageous in that the scanner may be adapted to different frequencies of ultrasonic energy transmission and reception by simply changing the frequency of the reference signal, it is subject to certain disadvantages primarily resulting from the use of the delay elements therein. Each delay element includes a large number of components, and the filtered signal passing therethrough is distorted due to attenuation and switching transients which result in degradation of image quality.

The approach taught in U.S. Pat. No. 4,140,022, Maslak, is notable for its recognition that the delay that must be afforded to each received electrical signal can be subdivided into a "fine" delay which is achieved by phase-shifting of the received electrical signal and a "coarse" delay which is achieved through the use of a delay element or elements. Phase-shifting is accomplished by passing the output signal from each transducer through a phase shifter which is set to provide the required amount of "fine" delay, or by mixing the output signal from each transducer with a reference signal whose frequency is chosen to yield a desired intermediate frequency in the mixer output and whose phase is chosen to yield a desired phase shift in the mixer output. The output signals from the phase shifters or mixers are then either applied to individual delay elements for each transducer, with the taps on the individual delay elements being connected by appropriate switches to a common summing junction (in a manner similar to the "parallel" approach illustrated in FIG. 1), or, connected through appropriate switches to respective taps of a master delay element having a single output (a "transverse" approach similar to that previously discussed for the Beaver patent). Due to the "fine" delay that has been achieved by phase-shifting, the number of taps on either the individual delay elements or the master delay element are significantly less than those required for the approach illustrated in FIG. 1, and the incremental delay values between adjacent taps are much greater. Accordingly, inexpensive electrical or acoustic delay lines may be used for the individual delay elements or the master delay element. Further, focusing can be readily achieved by adjusting the phase shift provided by either the phase shifters or the mixers.

The primary disadvantage of the approach taken in the Maslak patent again results from distortion that is occasioned by the use of delay elements. That is, signals passing through the delay elements are attenuated, and signals coupled into and out of the delay elements by switches are distorted by switching transients.

It is therefore an object of this invention to provide an improved electronic or phased array scanner for ultrasonic imaging apparatus.

It is another object of this invention to provide an improved beamforming apparatus and method for use in such a scanner.

It is yet another object of this invention to provide such a beamforming apparatus and method which does not require the use of any delay elements for the signals received by the transducers of the array.

It is still another object of this invention to provide an improved beamforming apparatus and method for electronic scanners that is particularly adapted to provide an output signal useful in developing a two-dimensional sector image.

It is a further object of this invention to provide a beamforming apparatus and method that can be implemented by the use of a minimum number of readily-available, inexpensive components.

It is still a further object of this invention to provide a beamforming apparatus and method that functions to provide a two-dimensional sector image of excellent image quality and resolution.

SUMMARY OF THE INVENTION

Briefly, the foregoing objects and other objects and advantages that will be apparent to those of ordinary skill in the art are achieved in a method that is adapted to be used with a plurality of ultrasonic transducers arranged in an array, wherein each transducer provides an electrical signal that represents returns of transmitted ultrasonic energy from reflective object points of an object. The method processes these electrical signals so as to form a received beam that is steered and focused to an incremental portion of the object, the method comprising the step of correlating the electrical signal from each transducer with an associated reference signal whose frequency, phase, and time characteristics are each related in a predetermined manner to the frequency, phase and time characteristics of those components in the associated electrical signal that represent returns of ultrasonic energy from object points within the incremental portion.

In the preferred embodiment, each reference signal is an in-phase or "real" reference signal that comprises a continuous binary signal whose frequency spectrum is substantially equal to the frequency spectrum of its associated electrical signal and whose phase has a predetermined relationship to the phase of those components in the associated electrical signal that represent returns from all object points within the incremental portion. Correlation is accomplished by multiplying each electrical signal by its associated reference signal so as to develop a plurality of product signals each related to the product of an electrical signal and its associated reference signal, and by integrating each product signal over an associated resolution window whose time occurrence and time duration substantially correspond, respectively, to the time occurrence and time duration of those components in the associated electrical signal that represent returns from object points within the incremental portion, so as to develop a plurality of "real" correlated signals each related to the time integral of at least one of the plurality of product signals. The plurality of "real" correlated signals are stored and combined so as to develop a "real" output signal representing a response of the array to returns from object points within the incremental portion. Each electrical signal is also correlated in a similar manner with an associated quadrature or "imaginary" reference signal so as to develop a plurality of "imaginary" correlated signals which are stored and combined so as to develop an "imaginary" output signal representing a response to the array to returns from object points within the incremental portion. The "real" and "imaginary" output signals are combined to develop signals representing the amplitude and phase of the reflections from object points within the incremental portion.

An optimum implementation of the foregoing method is provided in an apparatus which processes received signals from the transducers of the array that represent returns of a transmitted burst of ultrasonic energy from object points of an object, so as to form a received beam that is steered and focused to each of a plurality of successive incremental portions of the object. The apparatus comprises:

signal generator means for provising a plurality n of reference signals, each reference signal being associated with one of the received signals;

means for multiplying each received signal by its associated reference signal so as to develop a plurality n of product signals, each product signal being related to the product of the instantaneous magnitudes of a received signal and its associated reference signal;

means for combining the plurality n of product signals into a lesser plurality m of group product signals, each group product signal comprising a current whose magnitude is related to the sum of these ones of the plurality of product signals that have been developed from the received signals provided by a group of adjacent transducers in the array;

a plurality k of capacitance storage means;

switching matrix means adapted to selectively couple each of the plurality m of group product signals to each of the plurality k of capacitance storage means;

readout means adapted to selectively sample the total charge on each of the plurality k of capacitance storage means and to discharge each capacitance storage means when so sampled; and, wherein the signal generator means is operative to cause the switching matrix means to successively couple each group product signal to different ones of the plurality k of capacitance storage means during an associated plurality of successive resolution windows, each of whose time occurrence and time duration corresponds to the time occurrence and time duration of those components in the received signals, from which each group product signal has been developed, that represent returns of ultrasonic energy from object points within a unique one of the plurality of incremental portions, so that a given one of the plurality k of capacitance storage means receives charge contributions from each of the plurality m of group product signals for a unique one of the plurality of incremental portions, and wherein the signal generator means is further operative to cause the readout means to sample the total charge on a given one of the plurality k of capacitance storage means whenever all charge contributions for a unique one of the plurality of incremental portions have been made.

The foregoing method is also used in an ultrasonic scanner for providing a scanner output signal useful in constructing a real-time, two-dimensional sector image of an object, the scanner comprising:
- a plurality of ultrasonic transducers arranged in a linear array;
- a transmitter for producing a transmitted beam of ultrasonic energy by exciting the plurality of ultrasonic transducers so that the transducers emit successive bursts of ultrasonic energy, each of which propagates outwardly from the array along a radially-extending scan line;
- a process for steering and focusing a received beam along each scan line by processing a plurality of received signals from the plurality of ultrasonic transducers that represent returns of each transmitted burst of ultrasonic energy from object points of the object, the processor being operative: to multiply the plurality of received signals by a corresponding plurality of in-phase reference signals and by a corresponding plurality of quadrature reference signals to develop a plurality of in-phase and a plurality of quadrature product signals; to integrate each of the plurality of in-phase product signals and each of the plurality of quadrature product signals over a plurality of resolution windows established by a plurality of select signals, each resolution window representing the time occurrence of returns of the transmitted burst of ultrasonic energy from a unique incremental area of the object along the scan line, so as to develop a plurality of in-phase and a plurality of quadrature correlated signals; and, to successively combine those ones of the plurality of in-phase correlated signals and those ones of the plurality of quadrature product signals that correspond to each incremental area along the scan line so as to respectively provide an in-phase output signal and a quadrature output signal each having a succession of values corresponding to successive incremental areas along the scan line;
- means for combining the successive values of the in-phase and quadrature output signals to provide the scanner output signal which has a succession of values each representing the amplitude of returns from object points within a distinct incremental area along the scan line;
- a reference generator for providing the plurality of in-phase reference signals, the plurality of quadrature reference signals, and the plurality of select signals, the reference generator being adapted to adjust the relative phasing of the plurality of in-phase reference signals and the plurality of quadrature reference signals and to adjust the relative time occurrences of the plurality of resolution windows established by each of the plurality of select signals in response to information transferred thereto; and,
- a controller including a phase pattern memory having stored therein a plurality of sets of receive information, each set comprising the information required to steer the received beam along a unique scan line and to focus the received beam to each of the plurality of incremental areas along the unique scan line, the controller being operative to successively extract, from the phase pattern memory, the plurality of sets of receive information and to successively transfer the thus-extracted sets of receive information to the reference generator.

BRIEF DESCRIPTION OF THE DRAWINGS

The invention can best be understood by reference to the following portion of the specification, taken in conjunction with the accompanying drawings in which:

FIG. 1A is a chart illustrating the impulse response of a typical transducer and the related frequency spectrum of the response, and also illustrating a square wave approximation of that impulse response and the related frequency spectrum of the approximation;

FIGS. 8A and 8B are a functional block diagram of a reference generator forming part of the scanner in FIG. 5;

FIGS. 9A and 9B are a functional block diagram of a presettable divider in the reference generator in FIG. 8A;

DESCRIPTION OF THE PREFERRED EMBODIMENT

Figure 1:
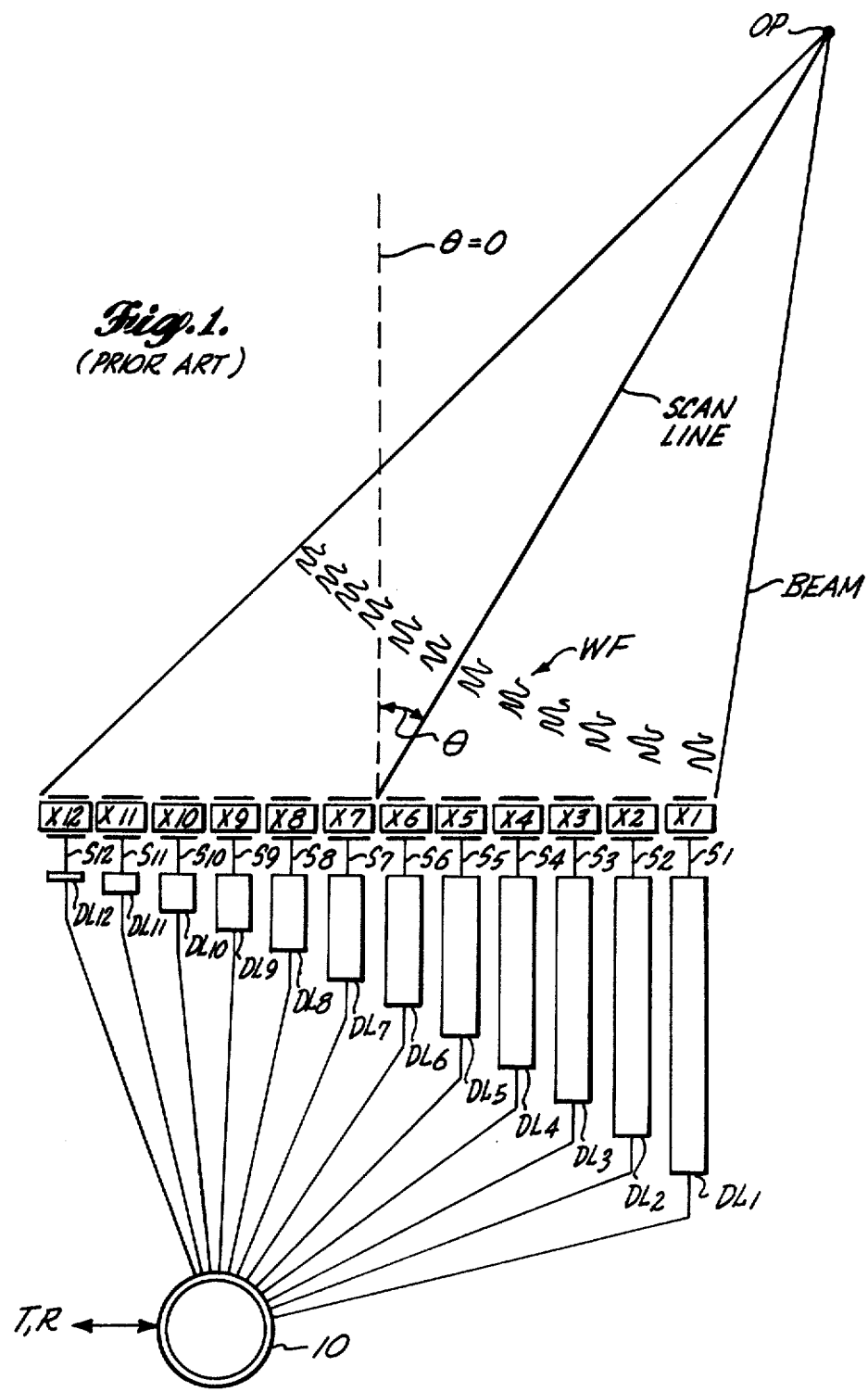
FIG. 1 is a functional representation of an electronic scanner known to the prior art, as previously described.

Despite the variety of the approaches taken in the prior art electrical scanners previously described, all of these scanners accomplish beamforming during reception by actual delay of the received electrical signal from each transducer. In contrast, the beamforming apparatus and method of the present invention utilize a matched-filter technique wherein each received electrical signal is correlated with a reference signal whose frequency, phase, time duration and time occurrence are related in a predetermined manner to the corresponding characteristics that the received electrical signal has for returns from object points within each of a plurality of distinct incremental portions of the object, referred to as "range cells". In the preferred embodiment, each range cell lies at a predetermined distance or range from the array and along a scan line which is disposed at a predetermined azimuthal angle which corresponds to the beam axis of the transmitted ultrasonic energy. For object points on the scan line and at the predetermined range, such correlation results in a correlated signal of maximum amplitude and, for object points increasingly separated from the scan line and from the predetermined range, such correlation results in a correlated signal of decreasing amplitude. For each range cell, the correlated signals are combined in order to develop a scanner output signal which represents the response of the array to all returns from object points within the range cell.

The time, phase, amplitude and frequency characteristics of the matched filter ideally should be those of the received electrical signal for object points within each range cell. With reference to FIG. 1A, it will be seen that the time and amplitude characteristics of the received electrical signal $s_i(t)$ from a given transducer $s_i$, representing returns of a transmitted burst of ultrasonic energy from a given object point, comprise a damped sinusoidal waveform whose peak amplitude occurs at a time $T_i$ following a time $t_0$ of the transmitted burst, with time $T_i$ being dependent on the distance between the object point and the transducer. This impulse response has a frequency spectrum that is substantially centered about the frequency $f_0$ of the transmitted burst. In practice, this impulse response may be approximated by that of a binary reference signal $b_i(t)$ that begins at a time $T'_i$ following time $t_0$ and that persists for a period $\Delta T$ thereafter. It will be noted that the frequency and phase of the binary reference signal $b_i(t)$ are identical to the fundamental frequency and phase of signal $s_i(t)$, and that the time occurrence and duration of the binary signal $s_i(t)$, which are represented by $T'_i$ and $\Delta T$, correspond to the expected time occurrence and duration of signal $s_i(t)$. Such an approximate impulse response yields a frequency spectrum that is also substantially centered about frequency $f_0$, with side lobes of successively-decreasing amplitude representing the harmonics of the binary reference signal.

Figure 2:
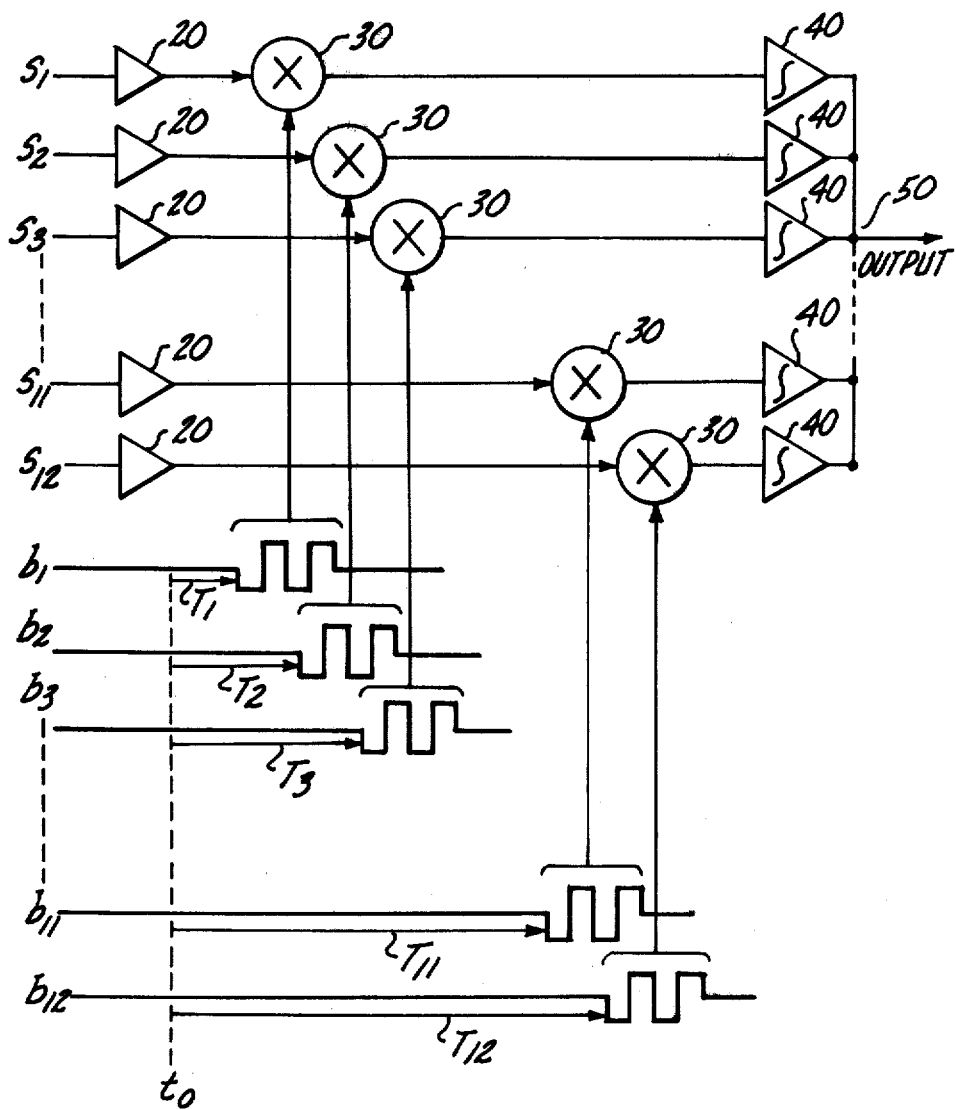
FIG. 2 is a functional block diagram of a beamforming apparatus illustrating the method of the present invention.

Referring now to FIG. 2, a beamforming apparatus utilizing this matched-filter technique includes a plurality of amplifiers 20 to which are applied the received electrical signals $s_1, s_2, s_3, \ldots s_{11}$ and $s_{12}$ from transducers X1, X2, X3, ... X11 and X12 of the array (reference FIG. 1). The amplified signals are each applied to a first input of a corresponding one of a plurality of mixers 30 to whose second input is applied one of a corresponding plurality of binary reference signals $b_1, b_2, b_3, \ldots b_{11}$ and $b_{12}$. The signals on the outputs of the plurality of mixers 30 are applied to the inputs of a respective plurality of integrators 40 whose outputs are connected to a common summing junction 50. Considering the case of the object point OP lying along a scan line at angle $\theta$ to the right of the array as illustrated in FIG. 1, it will noted that the binary reference signals applied to mixers 30 begin at successively later times $T_1, T_2, T_3, \ldots T_{11}$ and $T_{12}$ from the time $t_0$ of the transmitted burst from the leftmost transducer X12 in the array, and that each binary reference signal persists for the same predetermined number of cycles (e.g., two) at the frequency $f_0$ of the transmitted brust. The duration of each binary reference signal, or resolution window, determines the extent of the range cell, and the relative time occurrence of each resolution window determines the location of the range cell in the object. Each of the mixers 30 provides a signal on its output that is proportional to the product of the signals on its inputs, and each of the integrators 40 integrates its respective mixer output signal to provide a correlated signal, with the correlated signals being summed at summing junction 50 to provide a scanner output signal.

Figure 3:
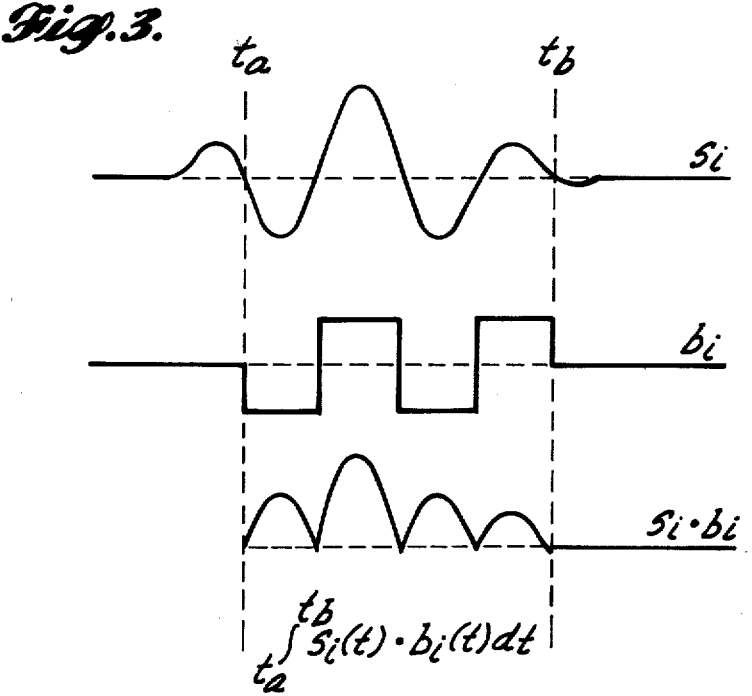
FIG. 3 is a timing diagram of various signals appearing in the functional block diagram of FIG. 2.

Referring now to FIG. 3, the binary reference signal $b_i$ for a received electrical signal $s_i$ from a given transducer $X_i$ has a frequency that is equal to the fundamental frequency of signal $s_i$ and a phase that is equal to that of signal $s_i$ for an object point at the center of a predetermined range cell. The extent and location of this range cell are determined by a time $t_a$ at which the binary reference signal $b_i$ is initiated and a time $t_b$ at which the binary reference signal $b_i$ is terminated. The resultant signal product, $s_i \cdot b_i$, has a frequency which is twice that of the fundamental frequency of transducer signal $s_i$ and an amplitude which is proportional to the product of the instantaneous amplitudes of signal $s_i$ and $b_i$. The contribution to the scanner output signal that is made by the correlated signal $c_i$ from each integrator 40 represents the time integral of the signal product over a time interval corresponding to the predetermined range cell, or, $$c_i(t) = \int_{t_a}^{t_b} s_i(t) \cdot b_i(t) dt$$

Viewed in another manner, the contribution made by each correlated signal is proportional to the area under the signal product $(s_i \cdot b_i)$ curve illustrated in FIG. 3. For object points increasingly separated from the center of the predetermined range cell, a corresponding phase shift occurs in the signal $s_i$. Since the phase of the corresponding binary reference signal $b_i$ is fixed, it will be seen that the resultant signal product for such object points, and thus the area under the signal product curve, decreases from that illustrated in FIG. 3, resulting in a lesser contribution to the scanner output signal. For object points outside the predetermined range cell, the binary reference signal is zero, resulting in a zero contribution to the scanner output signal.

Accordingly, by proper choice of the phasing of each binary reference signal and by proper choice of the time occurrence and time duration of the resolution window provided therein, the received beam of the array may be steered to any desired azimuthal angle and focused to any desired range cell at that azimuthal angle. Since the "delays" required for beam steering and focusing are applied to the binary reference signals rather than to the signals from the transducers, no delay elements are required for the transducer signals whereupon the disadvantages of the prior art electronic scanners that utilize such delay elements are avoided.

The beamforming apparatus illustrated in FIG. 2 is not, however, an optimum implementation of a matched-filter. To understand this point, consider a pulse-echo scanner particularly adapted for use in a medical ultrasonic imaging system and including, for example, thirty-two transducers each operating at a frequency $f_0$ of 2.5 MHz, with the array having an aperture of 13 mm. and being operated to steer the received beam over a maximum steering angle of $\pm 40°$. The maximum time interval or maximum delay between the arrival, at a transducer at one end of the array, of a received electrical signal representing returns from object points within a given range cell and the arrival of a corresponding received electrical signal at a transducer at the other end of the array (e.g., time interval $T_{12} - T_1$, FIG. 2) is approximately six microseconds, whereas the time duration ($\Delta T$) of the resolution window in each binary reference signal is approximately 0.6 microseconds. For the given range cell, the contribution made to the scanner output signal by the correlated signal associated with the transducer at one end of the array (e.g., transducer X1) will have to be maintained in some manner for up to ten $\Delta T$ until the corresponding contribution has been made by the correlated signal associated with the transducer on the other end of the array (e.g., transducer X12). As a result, the scanner in FIG. 2 has a relatively low signal processing rate.

As another example, it will be noted that for object points that are spaced $\lambda/4$ from the object point in the center of the range cell ($\lambda$ being the wavelength of the ultrasonic energy, $\lambda = c/f_0$, where c is the velocity of propagation of the ultrasonic energy through the object being scanned and $f_0$ is the frequency of the ultrasonic energy), the received electrical signal corresponding to that object point will be shifted in phase by $\lambda/4$, or, 90°, from the received electrical signal corresponding to an object point at the center of the range cell. If the signal $s_i$ in FIG. 3 is shifted by 90°, it will be seen that the signal $s_i$ and the binary reference signal $b_i$ yield a substantially zero signal product. Accordingly, the scanner in FIG. 2 fails to detect those object points that are spaced $\lambda/4$ from the object point in the center of each range cell. As yet another example, the scanner in FIG. 2 requires that the fundamental frequency of the binary reference signals be substantially equal to the center frequency of the received ultrasonic energy. If it is desired to shift the nominal operating frequency of the scanner, the frequency of the binary reference signals, and their accompanying phasing, time occurrences and time durations, must be scaled accordingly. As still another example, the scanner in FIG. 2 utilizes binary reference signals that are exactly in phase with the received electrical signals from an object point in the center of each range cell. In practice, such accuracy and precision is not readily obtainable and a phase accuracy of $\lambda/8$ has been found to be acceptable.

Taking the foregoing considerations into account, a practical form of the beamforming apparatus can be devised which affords high signal processing rates, excellent sensitivity to all object points within the area of scan, compatibility with transducers having different nominal operating frequencies, and $\lambda/8$ phase quantization.

The operation of such an apparatus in steering and focusing the received beam of the scanner, as illustrated in FIGS. 5–11 and described in detail hereinafter, can be summarized as follows. The received electrical signal from each transducer is multiplied by a continuous, "real" binary reference signal whose frequency spectrum is chosen to approximate that of the received electrical signal and whose phase is chosen to be within $\lambda/8$ ($\pm \lambda/16$) of the phase that the received electrical signal will have for an object point in the center of each range cell. Each received electrical signal is also multiplied by a continuous, "imaginary" binary reference signal whose phase is shifted by 90° from that of the corresponding "real" binary reference signal. Each signal multiplication is effected by the use of a mixer which provides an output current proportional to the desired signal product.

Since the received electrical signals corresponding to object points in a given range cell from a pedetermined number of adjacent transducers in the array overlap in time, the "real" signal products and the "imaginary" signal products from that predetermined number of transducers are grouped by connecting the "real" and "imaginary" mixer outputs, or currents, to respective "real" and "imaginary" group summing junctions. The current appearing at each "real" group summing junction and each "imaginary" group summing junction is then integrated over a predetermined resolution window whose time occurrence substantially corresponds to the overlap of the time occurrences of received electrical signals from the transducers of the group for object points within the desired range cell, by coupling the current on each "real" and "imaginary" group summing junction to one of a plurality k of capacitors in respective "real" and "imaginary" capacitor banks during the resolution window. The number k of capacitors in each capacitor bank is substantially equal to the maximum delay across the array between the time occurrences of received electrical signals from a group of transducers at one end of the array, for object points within any range cell, to the time occurrences of corresponding received electrical signals from a group at the other end of the array, divided by the time duration of each resolution window. One of the capacitors in each of the "real" and "imaginary" capacitor banks successively receives charge contributions from each "real" and "imaginary" group summing junction, respectively, that correspond to a desired scan line and a desired range cell along that scan line. At the same time, the remaining capacitors in each capacitor bank are receiving charge contributions from the group summing junctions corresponding to other range cells along that scan line.

When all the charge contributions corresponding to a desired scan line and range cell have been accumulated on a capacitor in each of the "real" and "imaginary" capacitor banks, the voltages across those capacitors (which represent the total charge across each capacitor) are each sampled and converted to digital form to obtain a "real" signal and a "imaginary" signal representing the total response of the array to returns from object points within the desired range cell along the desired scan line. Those capacitors are then discharged and thereafter connected to the group summing junctions to receive and accumulate the charge contributions for yet another range cell and/or scan line. The "real" and "imaginary" signals are then combined to develop signals representing the amplitude and phase of returns from object points within the desired range cell along the desired scan line, and may be supplied to a conventional scan converter and other apparatus for display and other signal processing.

Figure 5:
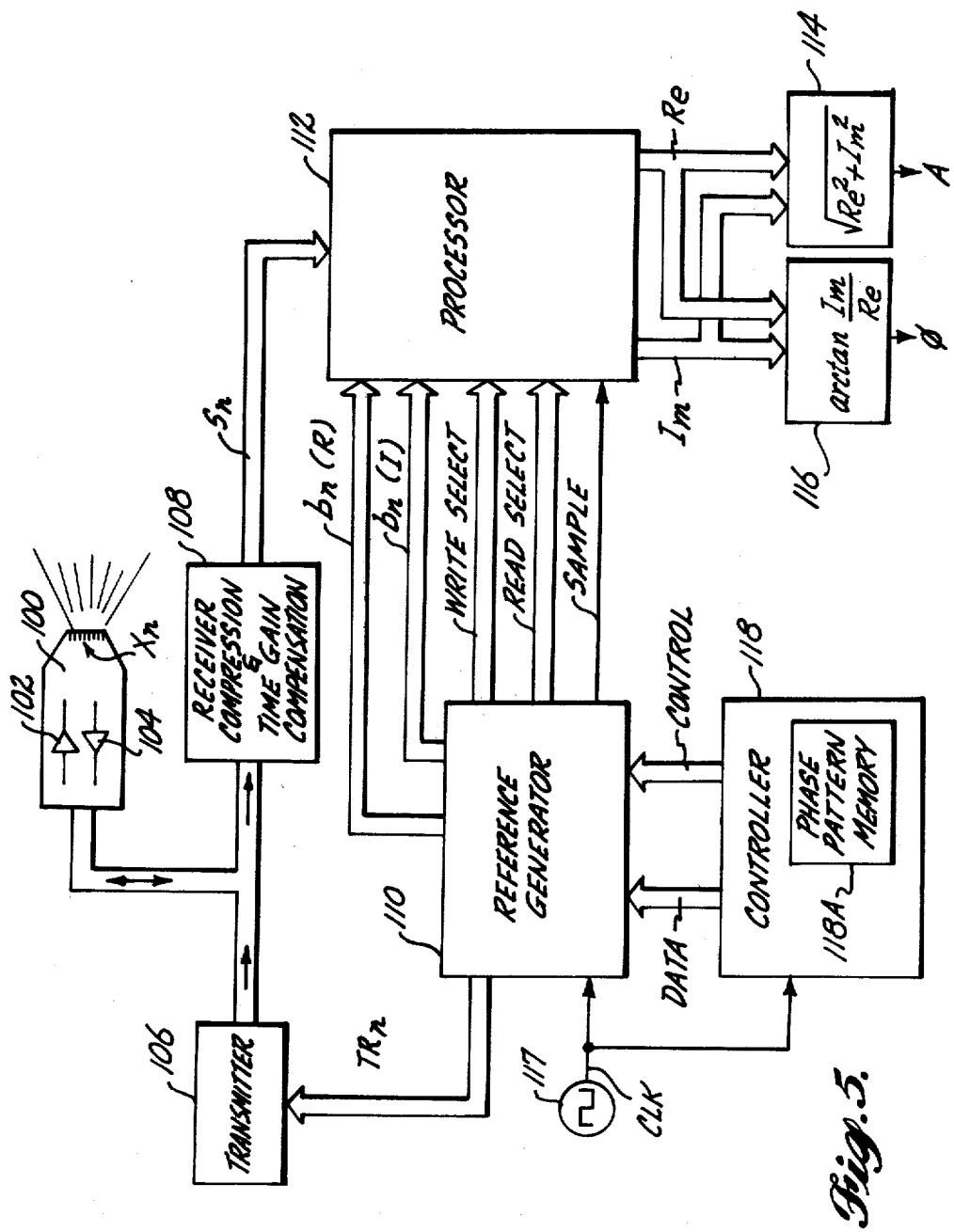
FIG. 5 is a functional block diagram of a preferred embodiment of an electronic scanner including the apparatus and method of the present invention.

Referring now to FIG. 5, the scanner therein includes a scan head 100 which is adapted to be brought into proximity to the object to be scanned and which includes a plurality of ultrasonic transducers Xn arranged in a linear array. Transducers Xn are of identical type and each is capable of transmitting and receiving ultrasonic energy in a predetermined nominal frequency band centered about $f_0$. In the preferred embodiment for a medical ultrasonic imaging system, thirty-two such transducers are provided, each operative at a center frequency $f_0$ of 2.5 MHz. Scan head 100 includes a plurality of amplifiers/switches 102 each adapted to couple a corresponding burst of transmit electrical pulses from a transmitter 106 to a corresponding one of the plurality of transducers Xn, and a plurality of amplifiers/switches 104 each adapted to couple a received electrical signal from a corresponding one of the plurality of transducers Xn to a receiver compression and time gain compensation circuit 108. Each burst of transmit electrical pulses is developed by transmitter 106 from a corresponding transmit signal TRn supplied to transmitter 106 by a reference generator 110. Preferably, each transmit signal TRn comprises a square wave signal having a predetermined number of cycles (e.g., two) at a predetermined frequency $f_0$ corresponding to the nominal operating frequency of each of the transducers Xn, with the phasing and relative time occurrence of each transmit signal TRn determining the azimuthal angle $\theta$ or scan line and focus of the resultant transmit beam emitted by transducers Xn. Within transmitter 106, each transmit signal TRn is converted into its corresponding burst of transmit electrical pulses which has a waveform sufficient to produce a desired burst of transmit acoustic pulses from the corresponding transducer Xn.

The amplitude of each received electrical signal is adjusted in receiver compression and time gain compensation circuit 108 to provide a corresponding received signal Sn which is supplied to a processor 112. As is well known, ultrasonic energy propagating through an object such as the human body is substantially attenuated, so that received electrical signals representing returns from distant object points are much lower in amplitude than received electrical signals representing returns from proximate object points. Accordingly, receiver compression and time gain compensation circuit 108 functions to adjust the amplitude of each received electrical signal so that each signal has substantially the same characteristics, notwithstanding the distance of the object point from the array.

In addition to being supplied with signals Sn from receiver compression and time gain compensation circuit 108, processor 112 is also supplied with a plurality of "real" binary reference signals bn(R), a plurality of "imaginary" binary reference signals bn(I), a plurality of WRITE SELECT signals, a READ SELECT signal, and a SAMPLE signal from reference generator 110. In the preferred embodiment, each signal bn(R) is a continuous square wave signal which is associated with one of the received signals Sn, and has a frequency equal to the transmitted frequency $f_0$ and a phase that is within $\lambda/8$ of the phase of the associated received signal Sn for returns from an object point in the center of each range cell along a predetermined scan line. Each signal bn(I) also comprises a continuous square wave signal which is associated with one of the received signals Sn, and has a frequency that is identical to that of the corresponding signal bn(R) and a phase that has shifted by 90° therefrom.

Processor 112 includes a plurality of "real" and "imaginary" mixers, with each "real" mixer functioning to multiply one of the received signals Sn by its associated signal bn(R) and with each "imaginary" mixer functioning to multiply one of the received signals Sn by its associated signal bn(I). Within processor 112, the outputs of a predetermined number of the "real" and "imaginary" mixers corresponding to a predetermined number (e.g., four) of adjacent transducers in the array are grouped by coupling those outputs to respective "real" and "imaginary" group summing junctions. Processor 112 also includes "real" and "imaginary" capacitor banks. Each WRITE SELECT signal functions to cause processor 112 to couple the signals appearing on the "real" and "imaginary" group summing junctions to one of the capacitors in the "real" and "imaginary" capacitor banks, at a time related to the expected occurrence of received electrical signals from the transducers in each group that correspond to returns from object points within a predetermined range cell along the predetermined scan line and for a duration equal to the desired resolution window and comprising a predetermined number of cycles (e.g., two) at frequency $f_0$.

When all charge contributions from the plurality of "real" and "imaginary" group summing junctions corresponding to reflections from object points within the same range cell along a scan line have been accumulated on one of the capacitors in each of the "real" and "imaginary" capacitor banks, the READ SELECT signal causes processor 112 to couple the voltages across those capacitors to respective "real" and "imaginary" sample-and-hold circuits within processor 112, and such voltages are stored in the respective sample-and-hold circuits in response to the SAMPLE signal which occurs substantially synchronous with each READ SELECT signal. The sampled voltages are converted to digital form by respective "real" and "imaginary" a/d converters within processor 112 which responsively provide a "real" output signal Re and a "imaginary" output signal Im from processor 112, and the capacitors are discharged after conversion has been effected.

Signals Re and Im are each supplied to processors 114 and 116. Processors 114 functions to develop an output signal A representing the amplitude of returns from object points within the predetermined range cell along the predetermined scan line, by applying the relationship $$A = \sqrt{Re^2 + Im^2}$$

Likewise, processor 116 functions to develop an output signal $\phi$ representing the phase of returns from object points within the predetermined range cell along the predetermined scan line, by applying the relationship $$\phi = \arctan(Im/Re)$$

Output signal A may be supplied to a scan converter along with information concerning the range of the related range cell from the array (r) and the related azimuthal angle $\theta$ of the scan line (by means not illustrated). The scan converter may then produce, in real-time, a resultant two-dimensional sector image of the object from the amplitude, range and angle information for successive range cells and scan lines. The phase information in output signal $\phi$ may be used to develop information as to the Doppler-shift of the object points, which Doppler-shift information is useful in providing real-time blood-flow imaging as described in more detail in Brandestini et al., "Blood-Flow Imaging Using A Discrete-Time Frequency Meter", IEEE Proceedings, 1978 Ultrasonic Symposium, pages 348-352.

The frequency, phase, and relative time occurrences of signals TRn, bn(R), and bn(I), as well as the relative time occurrences and durations of the WRITE SELECT and READ SELECT signals, are developed by reference generator 110 from CONTROL and DATA signals supplied thereto by a controller 118, and from a master clock signal CLK which is supplied to both reference generator 110 and controller 118 by a master clock 117. The frequency of signal CLK is preferably an integral multiple of frequency $f_0$, e.g., $8f_0$. Controller 118 functions to develop the CONTROL and DATA signals from information contained within a phase pattern memory 118A in synchronism with signal CLK, with the information with phase pattern memory 118A being related to the time "delays" required for beam steering and focusing upon both transmission and reception. The information within phase pattern memory 118A is computed offline by the use of well-known trigonometric functions such as the relationship set forth and described in column 4, lines 28-53 of U.S. Pat. No. 4,140,022 previously discussed.

Further discussion of the construction and operation of the scanner in FIG. 5 will be made hereinafter in conjunction with the detailed description of a specific embodiment of the processor 112 in FIGS. 6A, 6B and 7, of the reference generator 110 in FIGS. 8A, 8B, 9A and 9B, and of the controller 118 in FIG. 10.

Figure 4:
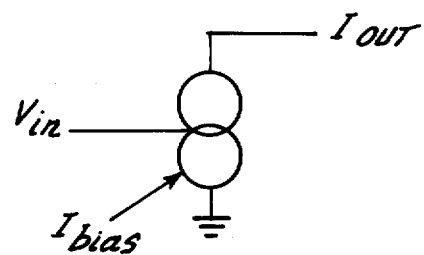
FIG. 4 is a schematic representation of an operational transconductance amplifier used as a mixer.
Figure 6A:
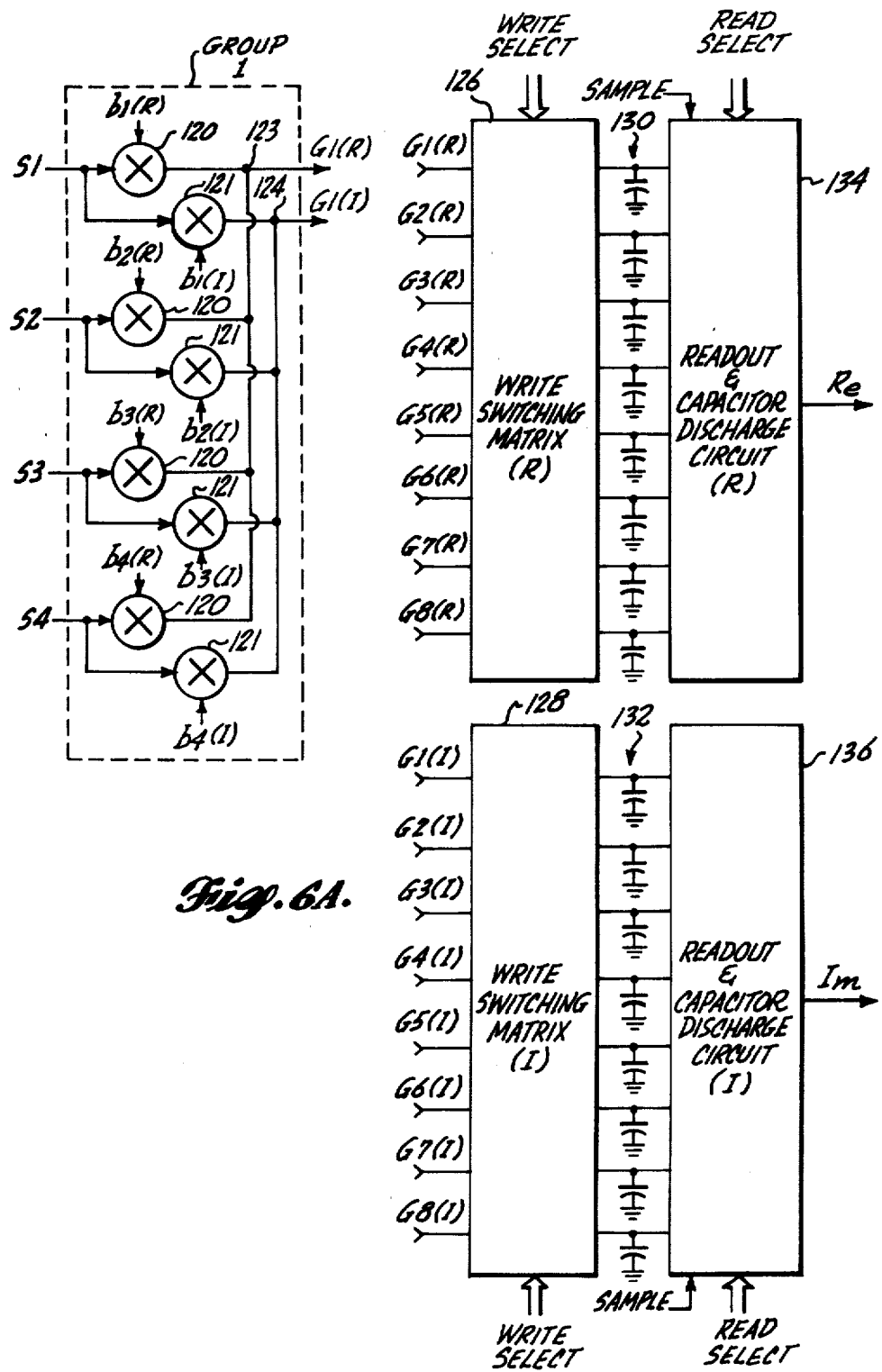
FIGS. 6A and 6B are a functional block diagram of a processor forming part of the scanner in FIG. 5.
Figure 6B:
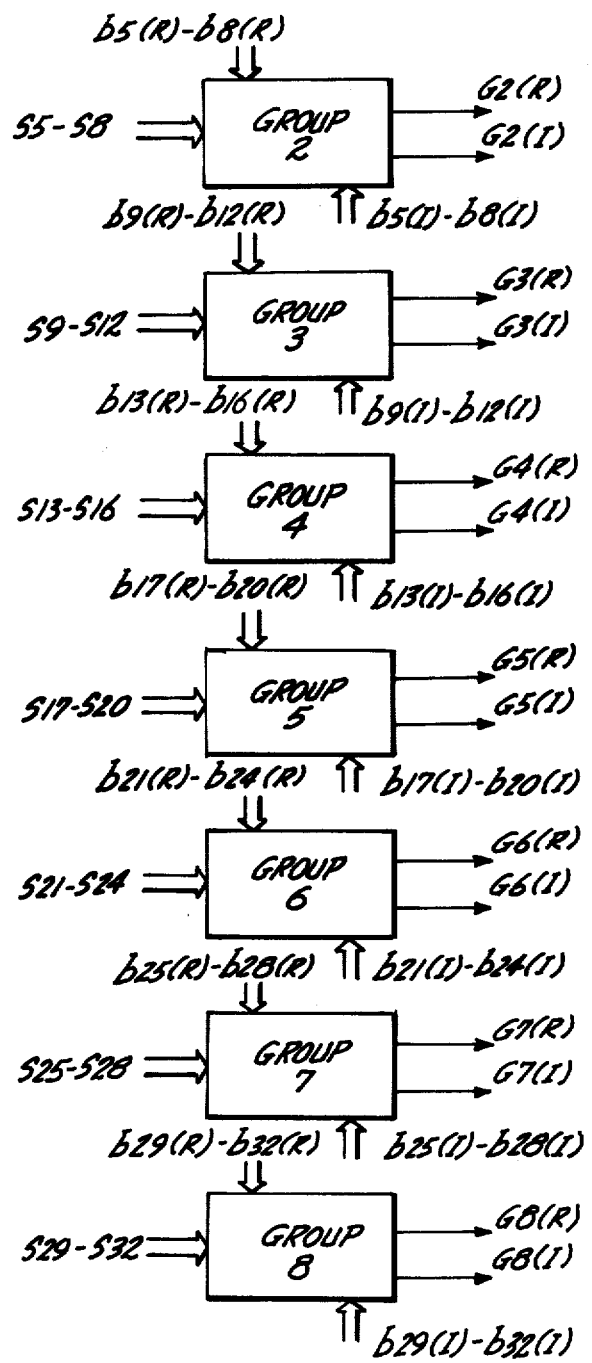

Referring now to FIGS. 6A and 6B, the embodiment of processor 112 illustrated therein includes a plurality of "real" mixers 120 and a plurality of "imaginary" mixers 121. The mixers are arranged in a plurality of groups (GROUP1-GROUP8), and within each group, the signal connections to and from the mixers are identical so that only GROUP1 is illustrated (in FIG. 6A). With each group, one of the mixers 120 and one of the mixers 121 is associated with one of the transducers Xn and the associated mixers 120, 121 accordingly receive the corresponding received signal Sn. The associated mixer 120 also receives the corresponding "real" binary reference signal bn(R) from reference generator 110, and the associated mixer 121 also receives the corresponding "imaginary" binary reference signal bn(I) from reference generator 110. Each of the mixers 120, 121 preferably comprises an operational transconductance amplifier such as that schematically illustrated in FIG. 4 which functions to provide an output current $I_{out}$ proportional to the product of the amplitude of a voltage $V_{in}$ (or, the received signal Sn) and the amplitude of a current $I_{bias}$ (or signal bn). Accordingly, the signal on the output of the associated mixer 120 comprises a current representing the product of the received signal Sn and the corresponding binary reference signal bn(R), and the signal on the output of the associated mixer 121 comprises a current representing the product of the received signal Sn and the corresponding binary reference signal bn(I). Within each group, the signals on the outputs of mixers 120 are connected to a common summing junction 123, and the signals on the outputs of mixers 121 are connected to a common summing junction 124. Summing junctions 123 and 124 provide current summation of the mixer output signals connected thereto, whereby a "real" group output signal or current Gm(R) appears on summing junction 123 and a "imaginary" group output signal or current Gm(I) apears on summing junction 124, with m corresponding to the group number (e.g., m=1 for GROUP1).

As previously described, the phase of each "real" binary reference signal bn(R) is chosen to be within λ/8 of the corresponding received signal Sn for returns from an object point at the center of each range cell, and the phase of the corresponding "imaginary" binary reference signal bn(I) is shifted 90° (or λ/4) from that of the corresponding "real" binary reference signal bn(R). In the preferred embodiment, the frequency of each binary reference signal is chosen to be equal to that of the transmitted ultrasonic energy (and thus approximately equal to the frequency of each received signal). However, as described hereinafter, the frequency (and phasing) of each binary reference signal may be adjusted as desired to yield a desired intermediate frequency in the resultant mixer output signals.

The received signals from adjacent ones of transducers Xn that represent returns from object points within the same range cell will overlap in time. Accordingly, the predetermined number of received signals Sn from adjacent transducers Xn that are applied to each group of mixers is preferably determined by the maximum number of received signals Sn from adjacent transducers Xn that overlap in time during the resolution window corresponding to each range cell. In an array including thirty-two transducers, it has been found that the received signals from four adjacent transducers can be processed as a group to develop corresponding "real" and "imaginary" group output signals, e.g., received signals S1-S4 are applied to the inputs of the GROUP1 mixers, received signals S5-S8 are applied to the inputs of the GROUP2 mixers, and so forth.

Group output signals Gm(R) are applied to respective inputs of a "real" write switching matrix 126, and group output signals Gm(I) are applied to respective inputs of an "imaginary" write switching matrix 128. Write switching matrix 126 and write switching matrix 128 each includes a plurality of outputs, each of which is connected to one of a plurality k of capacitors in a "real" capacitor bank 130 and an "imaginary" capacitor bank 132, respectively. In response to the WRITE SELECT signals from reference generator 110, write swiching matrix 126 and write switching matrix 128 each function to couple the group output signal on each input to one of the capacitors in the corresponding capacitor banks 130, 132. Each of the capacitors in capacitor banks 130, 132 is used for the storage and accumulation of all charge contributions corresponding to a single range cell lying along a desired scan line. As an example, let it be assumed that it is desired to scan a range cell at a predetermined range along a scan line to the right of the array, that the GROUP1 transducers are located at the rightmost end of the array, the GROUP2 transducers are located immediately to the left of the GROUP1 transducers, and so forth. Accordingly, the received acoustic wave front representing returns from object points within that range cell will be received first by the GROUP1 transducers, then by the GROUP2 transducers, and so forth. Under control of the WRITE SELECT signals, write switching matrix 126 and write switching matrix 128 accordingly couple group output signal G1(R) and group output signal G1(I) to one of the capacitors in capacitor banks 130, 132, respectively, then couple group output signal G2(R) and group output signal G2(I) to that capacitor in each of the capacitor banks 130, 132, and so forth.

Returning to the example under consideration, let it be assumed that a charge contribution to a capacitor in each of the capacitor banks 130, 132 from group output signals G1(R) and G1(I) have been completed and that these capacitors are now receiving a charge contribution from group output signals G2(R) and G2(I). At this time, the GROUP1 transducers will be receiving returns from object points within a range cell further away from the array along the desired scan line, whereupon write switching matrix 126 and write switching matrix 128, under control of the WRITE SELECT signals, couple group output signals G1(R) and Gl(I) to another capacitor in each of the capacitor banks 130, 132, respectively. At a subsequent point in time, charge contributions to these other capacitors in capacitor banks 130, 132 are made by group output signals G2(R) and G2(I), and so forth.

It will accordingly be seen that each capacitor in capacitor banks 130, 132 stores and accumulates the charge contributions from the group output signals that correspond to a unique range cell lying along a unique scan line. In an array including thirty-two transducers arranged in groups of four and operating at a nominal frequency of 2.5 MHz with an array aperture of 13 millimeters and with a desired range cell of 0.5 millimeters, each capacitor bank 130, 132 may include eight capacitors so as to allow simultaneous processing of returns from eight separate range cells along each scan line.

Each capacitor in capacitor banks 130, 132 is respectively connected to one of a corresponding plurality of inputs of a "real" readout and capacitor discharge circuit 134 and of an "imaginary" readout and capacitor discharge circuit 136. Readout and capacitor discharge circuits 134, 136 each have a single output upon which respectively appear output signals Re, Im. When all charge contributions for a given range cell along a scan line have been made to one of the capacitors in each of the capacitor banks 130, 132, each readout and capacitor discharge circuit 134, 136, under control of the READ SELECT signal from reference generator 110, selects that one of its inputs corresponding to that capacitor and, in response to the SAMPLE signal from reference generator 110, stores the voltage across that capacitor and converts the thus-stored voltage into digital form to accordingly produce the respective output signals Re, Im. At the time that the voltage on the selected capacitor is read, the capacitor is discharged so that the capacitor can thereafter store and accumulate the charge contributions for yet another range cell.

In the preferred embodiment, the binary reference signals, the WRITE SELECT signals and the READ SELECT signal from reference generator 110 cause the received beam to be steered to a plurality of scan lines (e.g., 160), and, along each scan line, to be focused to a plurality of range cells in each of a plurality of focal zones of successively greater dimensions progressing from an initial, relatively small focal zone proximate to the array to the largest focal zone distant from the array. Within each focal zone, the phase of the binary reference signals is constant, and a phase adjustment there is made upon each transition, or focal zone update, between adjacent focal zones so that the phase of the binary reference signals remains within $\pm \lambda/16$ of the corresponding received signals for returns from object points within all range cells.

Output signal Re, Im comprise a succession of digital values occurring at a predetermined rate of scan line and range cell update, each digital value representing the response of the array to returns from object points within a unique range cell along a unique scan line. As previously described, these digital values are processed by processors 114, 116 which accordingly provide a succession of values in output signals A, $\phi$, with each value representing, respectively, the amplitude and phase of returns from object points within a unique range cell alone a unique scan line.

Figure 7:
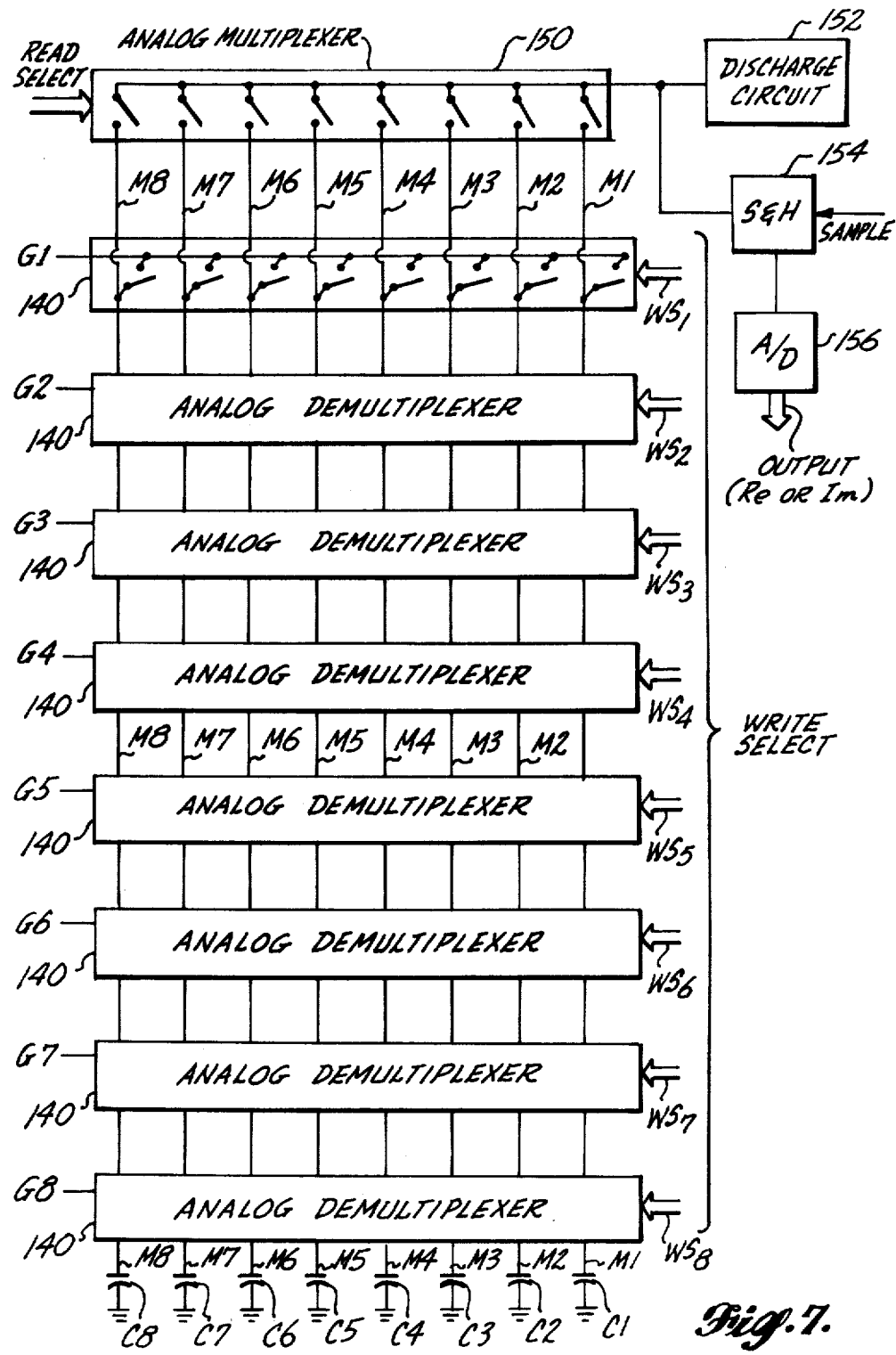
FIG. 7 is a functional block diagram of a portion of the processor in FIGS. 6A and 6B including a write switching matrix, a capacitor bank, and a readout and capacitor discharge circuit.

Referring also now to FIG. 7, each write switching matrix 126, 128 (FIG. 6A) includes a plurality of analog demultiplexers 140, with each analog demultiplexer 140 being associated with and receiving one of the group output signals Gm. Each analog demultiplexer 140 also receives a corresponding WRITE SELECT signal WSm from reference generator 110 (FIG. 5). Each of the capacitor banks 130, 132, includes a plurality of capacitors C1–C8, and lines M1–M8 interconnect capacitors C1–C8 with corresponding terminals of analog demultiplexers 140. Each signal WSm is preferably a 3-bit digital signal which accordingly has eight distinct binary states. For the duration of each distinct binary state in a signal WSm, the associated analog demultiplexer 140 couples the associated group output signal Gm to one of the lines M1–M8 and therefore to one of the capacitors C1–C8. Each binary state of a signal WSm persists for the duration of the desired resolution window, and the time occurrence of each binary state corresponds to a unique range cell. For the same range cell along the same scan line, each signal WSm will, at some time, have the same binary state so that charge contributions from all of the group output signals Gm are stored and accumulated on the same one of capacitors C1–C8. The binary states of signals WSm are controlled by reference generator 110 so that, at the same point in time, each of capacitors C1–C8 has coupled thereto at least one group output signal Gm, whereupon capacitors C1–C8 are, at the same time point in time, accumulating charge contributions for eight successive range cells along a scan line.

Each readout and capacitor discharge circuit 134, 136 (FIG. 6A) includes an analog multiplexer 150, a discharge circuit 152, a sample-and-hold circuit 154, and an analog-digital converter 156. Each of the lines M1–M8 is connected to a corresponding input of analog multiplexer 150, and the single output of analog multiplexer 150 is connected to discharge circuit 152 and sample-and-hold circuit 154. The READ SELECT signal from reference generator 110 preferably comprises a 3-bit digital signal which accordingly has eight distinct binary states. When the READ SELECT signal has a distinct binary state, analog multiplexer 150 functions to couple one of lines M1–M8, and therefore one of capacitors C1–C8, to discharge circuit 152 and sample-and-hold circuit 154. The READ SELECT signal changes state whenever one of the capacitors C1–C8 has received charge contributions from all of the group output signals, and remains in a given binary state until another one of the capacitors C1–C8 has received charge contributions from all of the group output signals. At the time that the READ SELECT signal changes state, the SAMPLE signal is momentarily provided whereupon the voltage across the selected capacitor is stored by sample-and-hold circuit 154. Thereafter, the voltage across the selected capacitor is discharged by discharge circuit 152 which is designed so as to completely discharge the selected capacitor by the time that the READ SELECT signal again changes state, so that the selected capacitor is again made available for storage and accumulation of charge contributions. Between the time occurrence of a given SAMPLE signal and that of a successive SAMPLE signal, the voltage stored in sample-and-hold circuit 154 is converted to digital form by analog/digital converter 156 which responsively provides an output signal (Re or Im) having a digital value representing the voltage stored in sample-and- hold circuit 154.

Referring now to FIGS. 5 and 8A, reference generator 110 includes a plurality of presettable dividers 160, with each presettable divider 160 being adapted to providce the transmit signals TRn, the binary reference signals bn(R) and bn(I), and the WRITE SELECT signals WSm for a pair of groups of transducers Xn. As an example, the presettable divider 160 for GROUP1 and GROUP2 provides signals TR1–TR8, b1(R)–b8(R), b1(I)–b8(I), and WS1–WS2. Presettable dividers 160 each receive the signal CLK from the master clock 117, the DATA signals from controller 118 comprising the data appearing on a data bus D0–D7, and the CONTROL signals from controller 118 including a signal CLR. The CONTROL signals from controller 118 also include a plurality of slip signals SLn, a plurality of load element counter signals LDP1-LDP8, and a plurality of load group counter signals LDG1-LDG4. The organization and use of the slip, load element counter and load group counter signals will be understood after considering the detailed structure and operation of each presettable divider 160 as described hereinafter. At this point, it is sufficient to note that signals SL1-SL8, signals LDP1-LDP2, and signal LDG1 are applied to the presettable divider 160 for GROUP1 and GROUP2; that signals SL9-SL16, LDP3-LDP4, and signal LDG2 are applied to the presettable divider 160 for GROUP3 and GROUP4, that signals SL17-SL24, LDP5-LDP6, and signal LDG3 are applied to the presettable divider 160 for GROUP5 and GROUP6; and, that signals SL25-SL32, LDP7-LDP8, and signal LDG4 are applied to the presettable divider 160 for GROUP7 and GROUP8.

Referring now to FIG. 8B, reference generator 110 also includes a selector 162 which receives signals WS1 and WS8 from, respectively, the presettable divider 160 for GROUP1 and GROUP2 and the presettable divider 160 for GROUP7 and GROUP8, and which also receives a signal R/L from controller 118. Each WRITE SELECT signal comprises a three-bit digital signal which accordingly has eight distinct binary states each corresponding to one of capacitors C1-C8 in FIG. 7. Since each WRITE SELECT signal is developed from a group counter as described hereinafter, each binary state thereof will hereinafter be referred to as a "count". Whenever a signal WSm has a certain count, the corresponding analog demultiplexer 140 (FIG. 7) couples the corresponding group summing junction for group Gm to a predetermined one of capacitors C1-C8. If the received beam is being steered to the left of the array, it will be appreciated that the transducers associated with GROUP8 are the first to receive returns from object points within any range cell and that the count represented by WRITE SELECT signal WS8 indicates that one of capacitors C1-C8 which is currently receiving charge contributions from the group summing junction for GROUP8 for that range cell. Likewise, if the received beam is being steered to the right of the array, it will be appreciated that the transducers associated with GROUP1 are the first to receive returns from object points within any range cell and that the count represented by WRITE SELECT signal WS1 indicates that one of capacitors C1-C8 which is currently receiving charge contributions from the group summing junction for GROUP1 for that range cell. As will be apparent from the ensuing discussion, the counts developed within the group counters cause all charge contributions for a given range cell to be stored in one of the capacitors C1-C8, and all of the charge contributions for a succeeding range cell to be stored in the adjacent one of capacitors C1-C8, so that the charge contributions for succeeding range cells are distributed to capacitors C1-C8 in a cyclic manner (e.g., the charge contributions for the first range cell go to capacitor C1, the charge contributions for the second range cell go to capacitor C2, the charge contributions for the third range cell go to capacitor C3, etc.). If the received beam is being steered to the left or to the right of the array, it necessarily follows that the total charge contributions for a given range cell will be stored in the capacitor that immediately precedes that capacitor indicated by the count in WS8 and WS1, respectively.

Accordingly, either signal WS8 or signal WS1 is selected by selector 162 in response to the signal R/L, for respective left and right beam steering. The count within the selected signal is then decremented by one in adder circuit 164, with the output signal from adder circuit 164 comprising the READ SELECT signal. As can be appreciated, the READ SELECT signal comprises a three-bit digital signal whose count indicates and accordingly selects that one of capacitors C1-C8 in which is stored the total charge contribution for a given range cell. The READ SELECT signal is also applied to a decoder 166. At each time that the count represented by the READ SELECT signal changes, decoder 166 provides an output signal which responsively causes a trigger circuit 168 to provide the SAMPLE signal. As has been previously described in conjunction with FIG. 7, provision of the SAMPLE signal causes sample-and-hold circuit 154 to store therein the voltage across that one of capacitors C1-C8 that has been selected by the READ SELECT signal.

With reference now to FIG. 9A, the presettable divider 160 for GROUP1 and GROUP2 (the remaining presettable dividers 160 being of identical construction and operation) includes a plurality of prescalers and a plurality of element counters, each prescaler and element counter being associated with one of transducers X1-X8. Each prescaler includes an EXCLUSIVE-OR gate 170 and a D (delay) flip-flop 172. Each element counter includes a two-to-one multiplexer 174, a D flip-flop 176, a two-to-one multiplexer 178, and a D flip-flop 180. The signals CLK and CLR from, repsectively, master clock 117 and controller 118 are applied to respective clock (C) and clear inputs of flip-flops 172. The Q output of the flip-flop 172 in each prescaler is connected to one of the inputs of the EXCLUSIVE-OR gate 170 in the prescaler, and to the clock (C) inputs of the flip-flops 176 and 180 in the corresponding element counter. The corresponding slip signal SLn is applied to the other input of the EXCLUSIVE-OR gate 170 in the prescaler and the output of the EXCLUSIVE-OR gate 170 is connected to the signal (D) input of the flip-flop 172 in the prescaler.

The individual lines within data bus D0-D7 are each connected to selected ones of multiplexers 174, 178 in the element counters. Specifically, line D0 is connected to the A inputs of multiplexers 174 in the element counters corresponding to transducers X1 and X5; line D1 is connected to the A inputs of multiplexers 178 in the element counters corresponding to transducers X1 and X5; line D2 is connected to the A inputs of multiplexers 174 in the element counters corresponding to transducers X2 and X6; line D3 is connected to the A inputs of multiplexers 178 in the element counters corresponding to transducers X2 and X6; line D4 is connected to the A inputs of multiplexers 174 in the element counters corresponding to transducers X3 and X7; line D5 is connected to the A inputs of multiplexers 178 in the element counters corresponding to transducers X3 and X7; line D6 is connected to the A inputs of multiplexers 174 in the element counters corresponding to transducers X4 and X8; and, line D7 is connected to the A inputs of multiplexers 178 in the element counters corresponding to transducers X4 and X8.

Within each element counter, the Y output of multiplexer 174 is connected to the signal (D) input of flip-flop 176, the Q output of flip-flop 176 is connected to the B input of multiplexer 178, the Y output of multiplexer 178 is connected to the signal (D) input of flip-flop 180, and the $\overline{Q}$ output of flip-flop 180 is connected to the B input of multiplexer 174. The signal LDP1 is connected to the control inputs of multiplexers 174, 178 in the element counters associated with transducers X1–X4, and the signal LDP2 is connected to the control inputs of multiplexers 174, 178 in the element counters associated with transducers X5–X8.

Those skilled in the art will recognize each prescaler as a divide-by-two counter which functions to provide an output signal on output Q of flip-flop 172 that is synchronous with the signal CLK and that has a frequency that is one-half that of signal CLK, and that can be inhibited from counting whenever the slip signal applied thereto has a low logic level. Specifically, flip-flop 172 is cleared in response to the signal CLR so that the signal on output Q has a low logic level. Assuming that the slip signal (e.g., signal SL1) has a high logic level, the output of EXCLUSIVE-OR gate 170 will have a high logic level. Upon the next positive-going transition in the signal CLK, flip-flop 172 will be set whereupon the signal on output Q goes to a high logic level and the signal on the output of EXCLUSIVE-OR gate 170 goes to a low logic level. At the succeeding positive-going transition in signal CLK, flip-flop 172 is cleared and the signal on output Q goes to a low logic level. Whenever the slip signal (e.g., signal SL1) goes to a low logic level, however, it will be noted that when the Q output of flip-flop 172 goes to a low logic level, the signal on the output of EXCLUSIVE-OR gate 170 goes to a low logic level and inhibits flip-flop 172 from thereafter changing state until the slip signal again goes to a high logic level.

Those skilled in the art will also recognize that each element counter comprises a divide-by-four ring counter that is clocked at the frequency of the signal appearing on the Q output of the flip-flop 172 in the corresponding prescaler and that accordingly provides signals on the Q outputs of flip-flops 176 and 180 whose frequency is one-fourth that of the signal appearing on the Q output of flip-flop 172. It will also be noted that the count within each element counter can be set to any desired count (0–3) as established by the signals appearing on the lines of the data bus connected thereto (e.g., lines D0, D1) and in response to the load element counter signal applied thereto (e.g., LDP1).

Specifically, signal LDP1 is normally at a low logic level, whereupon the B inputs of multiplexers 174, 178 are connected to the Y outputs thereof. As a result, the Q output of flip-flop 176 is normally connected to the D input of flip-flop 180 and the $\overline{Q}$ output of flip-flop 180 is normally connected to the D input of flip-flop 176. Let it be assumed that the signals on the Q outputs of flip-flops 176 and 180 each have a high logic level, and that the signals appearing on the D inputs of flip-flops 176, 180 accordingly have a low logic level and a high logic level, respectively. Upon the next positive-going transition of the signal appearing the Q output of flip-flop 172, flip-flop 176 will be cleared, whereupon the signal on the Q output of flip-flop 176 goes to a low logic level. However, flip-flop 180 remains set. Upon the succeeding positive-going transition in the signal appearing on the Q output of flip-flop 172, flip-flop 180 will be cleared so that the signal on the Q output of flip-flop 180 goes to a low logic level and the signal on the $\overline{Q}$ output thereof goes to a high logic level. However, flip-flop 176 remains cleared. Upon the next positive-going transition in the signal appearing in the Q output of flip-flop 172, flip-flop 176 will be set so that the signal on the Q output of flip-flop 176 goes to a high logic level. However, flip-flop 180 remains cleared. Upon the next positive-going transition in the signal appearing on the Q output of flip-flop 172, flip-flop 180 will be set and flip-flop 176 will remain set. Thereafter, the cycle as described repeats for each group of four successive pulses in the signal appearing on the Q output of flip-flop 172.

In summary, the signal CLK has a frequency which is a predetermined multiple of the nominal transmit and receive frequency $f_0$, e.g., $8f_0$; the signal appearing on the Q output of the flip-flop 172 in each prescaler has a frequency which is one-half that of the signal CLK, i.e., $4f_0$, and the signals appearing on the Q outputs of flip-flops 176, 180 in each element counter each have a frequency which one-quarter that of the signal appearing on the Q output of flip-flop 172, i.e., $f_0$. Since the signals appearing on the Q outputs of flip-flops 176, 180 are in quadrature, the signals accordingly comprise the "imaginary" binary reference signal bn(I) and the "real" binary reference signal bn(R), respectively.

It will also be recognized that by varying the count within each element counter, the phase of each binary reference signal therefrom may be shifted in increments of $\lambda/4$ (at frequency $f_0$) from any arbitrarily-defined reference phase. To accomplish this phase shifting, the load element counter signal (e.g., LDP1) is provided, whereupon multiplexers 174, 176 connect their A inputs to their Y outputs. As a result, flip-flops 176, 180 are set to a state corresponding to the logic level of the signals appearing on the corresponding lines of data bus D0–D7 upon the next positive-going transition in the signal appearing on the Q output of flip-flop 172. Flip-flops 176, 180 will thereafter remain in these states until termination of the load element counter signal. Since the same load element counter signal is applied to all element counters in each group (e.g., signal LDP1 is applied to the element counters for transducers X1–X4 in GROUP1), it will be seen that when signal LDP1 terminates, the binary reference signals from each element counter in the group will have a predetermined phase relationship to the binary reference signals from all other element counters in the group, which relative phase relationships may be adjusted in increments of $\lambda/4$ (at frequency $f_0$) as previously described. If the load element counter signals applied to all of the element counters in all of the groups also have a predetermined phase relationship, it will be seen that all of the element counters may be set to any desired phase relationship with each other.

by thus presetting the element counters, $\lambda/4$ accuracy in the binary reference signals therefrom can be obtained. The phase of each binary reference signal may also be shifted by $\lambda/4$ (at frequency $f_0$) by applying a slip signal to the corresponding prescaler for a time substantially equal to one cycle of the signal CLK. For example, if slip signal SL1 is applied to the EXCLUSIVE-OR gate 170 associated with transducer X1 for one period of the signal CLK, flip-flop 172 will be inhibited from changing state for that period which will necessarily cause the binary reference signals b1(I), b1(R) to be delayed by an interval corresponding to $\lambda/8$ (at frequency $f_0$). By accordingly "slipping" or not "slipping" each element counter, the relative phases of the binary reference signals from all element counters may be relatively adjusted by $\lambda/8$ to refine the focus of the received beam for each focal zone. As will also be apparent from a consideration of the manner in which the WRITE SELECT signals are generated, the "slipping" or not "slipping" of each element counter can be used to provide dynamic focal zone updates along each scan line.

Referring specifically to FIG. 9B, presettable divider 160 also includes, for each group corresponding thereto (e.g., GROUP1 and GROUP2), a four-bit binary counter 190, an AND gate 192, a AND gate 194, and a plurality of AND gates 196. The signal appearing on the Q output of the flip-flop 172 in the prescaler associated with a transducer near the middle of each group (e.g., signal P2 from the prescaler associated with transducer X2 in GROUP1, and signal P6 from the prescaler associated with transducer X6 in GROUP2) is applied to the clock (C) input of its associated group counter 190. The binary reference signals associated with those transducers (e.g., signals b2(I) and b2(R) for GROUP1 and signals b6(I) and b6(R) for GROUP2) are applied through respective AND gates 192 to the enable (EN) inputs of their associated group counters 190. Lines D0–D3 of data bus D0–D7 are connected to corresponding inputs of the group counter 190 for GROUP1, and lines D4–D7 of data bus D0–D7 are connected to corresponding inputs of the group counter 190 for GROUP2. The signal LDG1 is applied to a load (L) input of each group counter 190.

Each group counter 190 has a plurality of outputs A, B, C and D, with the signals on the B, C and D outputs of each group counter 190 comprising the WRITE SELECT signal for the associated group (e.g., WS1 for GROUP1 and WS2 for GROUP2). The signals on the B, C and D outputs of each group counter 190 are also applied to corresponding inputs of the AND gate 194 associated with the group, along with a signal T/R comprising one of the CONTROL signals from controller 118. The signal on the output of the AND gate 194 in each group is applied to a corresponding input of each of the AND gates 196 in the group, and the other inputs of the AND gates 196 in the group are supplied with the "real" binary reference signals for the transducers in that group (e.g., signals b1(R), b2(R), b3(R) and b4(R) for GROUP1 and signals b5(R), b6(R), b7(R) and b8(R) for GROUP2). The signals appearing on the outputs of the AND gates 196 in each group comprise the transmit signals for the transducers of that group (e.g., TR1, TR2, TR3 and TR4 for GROUP1 and TR5, TR6, TR7 and TR8 for GROUP2).

Considering GROUP1 as an example, it will be appreciated from the preceding discussion of the prescalers and element counters (reference FIG. 9A) that signals b2(I) and b2(R) each have a positive logic level for a period of λ/4 (at frequency $f_0$), once every cycle at frequency $f_0$. Accordingly, the signal on the output of AND gate 192 will have a series of positive-going transitions that occur at frequency $f_0$. Group counter 190 is therefore enabled to increment its count by one at frequency $f_0$, and the count therein is actually incremented upon the next positive-going transition in signal P2 following the time that group counter 190 was enabled. The count within group counter 190 is represented in binary form on outputs A, B, C and D thereof, and it will be appreciated that the binary state of the WRITE SELECT signal changes once every two cycles of frequency $f_0$ to accordingly define the duration of the resolution window for the group. It will also be appreciated that the binary state of the WRITE SELECT signal changes in a manner so as to cause the associated analog demultiplexer 140 (FIG. 7) to connect the group summing junction to capacitors C1–C8 in sequence. As an example, let it be assumed that group counter 190 has been cleared. For two successive cycles at frequency $f_0$ (counts 0 and 1), the signals on the B, C and D outputs of group counter 190 will be "000", whereby the associated analog demultiplexer 140 connects the associated group summing junction to capacitor C1. For the next two successive cycles at frequency $f_0$ (counts 2 and 3), the signals on the B, C and D outputs of group counter 190 will be "001", whereby the associated analog demultiplexer 140 connects the associated group summing junction to capacitor C2. For the next two succeeding cycles at frequency $f_0$ (counts 4 and 5), the signals on the B, C and D outputs of group counter 190 will be "010", whereby the associated analog demultiplexer 140 connects the associated group summing junction to capacitor C3. Group counter 190 continues to operate in this manner up through count 15, and thereafter clears itself and repeats its counting operation.

It will be appreciated that the relative time occurrence of each resolution window for a group counter is determined in part by the preset count that has been stored in the associated element counter whose reference signals are used to develop an enable signal for the group counter (with the preset count accordingly varying the relative phasing of those reference signals, e.g., b2(I) and b2(R) for GROUP1, as previously described) and by "slipping" or not "slipping" the associated prescaler (which varies the time occurrence of the output signal from that prescaler, e.g., P2 and which also varies the relative phasing of the associated binary reference signals, e.g., b2(I) and b2(R)). It will also be appreciated that the relative time occurrence of a resolution window for the same range cell for all group counters can also be varied by setting each group counter to a predetermined count. For example, if the received beam is to be steered to the left of the array, the group counter associated with that group that is the first to receive returns, e.g., GROUP8, will be set to count 0, the group counter associated with the next group, e.g., GROUP7, will be set to a count of 2, the group counter associated with the next group, e.g., GROUP6, will be set to a count of 4, and so forth. In order to preset the count within each group counter, the load group counter signal is provided by controller 118, whereby a count represented by the signals on those leads of data bus D0–D7 that are connected to the group counter is stored therein. Accordingly, when signal LDG1 is being supplied, the count represented by the signals on lines D0–D3 is stored in the group counter 190 for GROUP1, and the count represented by the signals on lines D4–D7 is stored in the group counter 190 for GROUP2.

In order to develop the transmit signals from each group, each group counter 190 is preset to a count less than 14. When the group counter 190 has incremented to count 14, it will be noted that the signals on outputs B, C and D are all at a high logic level. If the signal T/R from controller 118 also has a high logic level, a high logic level output is provided by the associated AND gate 194 which persists for two cycles at frequency $f_0$ (counts 14 and 15) and which enables each of the AND gates 196 in the group to couple its associated "real" binary reference signal to its output to accordingly provide a transmit signal to its associated transducer. As can be appreciated, the relative time occurrence of the transmit signals from a group is determined by the count that has been preset into the group counter 190 for the group (e.g., that appearing on lines D0–D3 for GROUP1), and by the relative phasing of the "clock"

and "enable" signals thereto (e.g., signal P2 and the signal developed from signals b2(I) and b2(R)). The phase of each transmit signal in the group is determined by the phase of its associated "real" binary reference signal, e.g., b1(R) for signal TR1, b2(R) for signal TR2, b3(R) for signal TR3, and b4(R) for signal TR4.

As described in more detail hereinafter in conjunction with FIGS. 10 and 11, controller 118 causes the scanner to steer both the transmitted beam and the received beam simultaneously along one of a plurality of angularly-disposed scan lines and, for each scan line, to undertake a transmit/receive cycle. At the beginning of each transmit/receive cycle, each of the element counters and group counters is preset to a predetermined count and each of the prescalers is "slipped" or not "slipped", in order to preset steering of the transmitted beam along the desired scan line and at any desired focus (a moderate mid-range focus may be used). Thereafter, the signal T/$\overline{R}$ goes to a high logic level, whereby each of the transducers is excited by its associated transmit signal so that a transmitted beam with desired steering and focusing is produced. The signal appearing on the output of AND gate 194 in the rightmost group in the array, e.g., GROUP1 (signal POR in FIG. 9B), and the signal appearing on the output of AND gate 194 in the leftmost group in the array, e.g., GROUP8 (signal POL, not illustrated), are also applied to controller 118. When one of the signals POR, POL appears (depending on whether the array is being steered to the left or to the right, respectively), all of the transducers have been excited whereupon controller 118 causes the signal T/R to go to a low logic level, thereby disabling further transmission. Thereafter, each of the group counters and element counters is preset to a predetermined count, and each of the prescalers is "slipped" or not "slipped" so as to preset steering of the received beam to the desired scan line and focusing of the received beam to an initial focal zone along that scale line, e.g., the closest focal zone to the array. As the "received" electrical pulses from the transducers are thereafter being processed by the scanner, focal zone updates, to focal zones progressively further away from the array, are accomplished by "slipping" or not "slipping" each prescaler. When maximum range has been reached, the transmit/receive cycle terminates and a new transmit/receive cycle for another scan line is begun.

Figure 10:
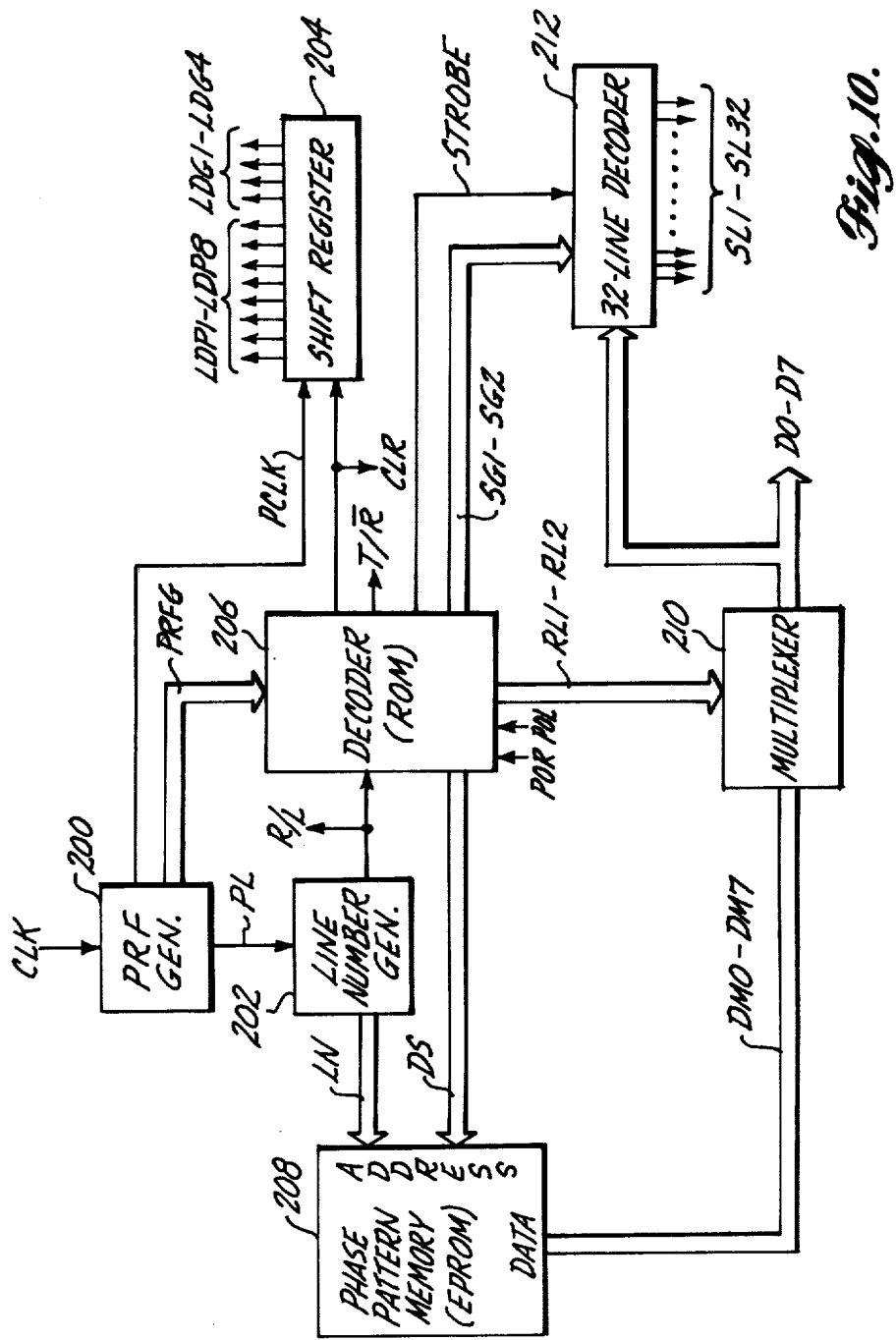
FIG. 10 is a functional block diagram of a controller forming part of the scanner in FIG. 5; and, FIG. 11 is a timing diagram illustrating the operation of the controller in FIG. 10.

Referring now to FIG. 10, the embodiment of controller 118 illustrated therein includes a PRF generator 200, a line number generator 202, a shift register 204, a decoder 206 (which may include a read-only memory or ROM), a phase pattern memory 208 (which may consist of an erasable programmable read-only memory or EPROM), a multiplexer 210, and a 32-line decoder 212. The signal CLK from master clock 117 is applied to PRF generator 200, which develops therefrom signals PCLK, PRFG and PL. Signal PCLK comprises a preset clock signal, and signal PRFG comprises a multibit digital signal that changes state at the frequency of PCLK and in synchronism therewith. Signal PL comprises a pulse signal whose frequency is much less than $f_0$, with the interval between successive pulses in signal PL determining the duration of a single transmit/receive cycle for each scan line.

Signal PL is applied in line number generator 202 which responsively provides a mulibit digital signal LN to phase pattern memory 208, and the signal R/L to decoder 206 and to selector 162 (FIG. 8B). Since the scan lines may be chosen as being symmetrical about a line drawn perpendicular to the center of the array ($\theta=0$), it will be seen that phase patterns for only one-half the total number of scan lines need be stored in phase pattern memory 208, e.g., for eighty scan lines located, for example, to the right of the array. For each signal PL, line number generator 202 accordingly changes the binary state of signal LN to select the phase pattern information in phase pattern memory 208 for one scan line, and also causes the signal R/L to be at a high logic level or a low logic level, depending on whether the selected scan line is to the right or left of the array.

The phase pattern information in phase pattern memory 208 is preferably organized in blocks, each block including the phase pattern information for one scan line and being addressed by signal LN which is preferably applied to the high-order address inputs of phase pattern memory 208. Within each line block, the phase pattern information is organized into a plurality of 8-bit bytes arranged in a predetermined order, with each bit being selected and caused to appear on the DATA outputs of phase pattern memory 208 by a multibit digital signal DS from decoder 206 which is applied to the low-order address inputs of phase pattern memory 208. Signal DS from decoder 206 changes state in synchronism with the signal PRFG applied to decoder 206, so that the bytes selected by signal DS in the line block selected by signal LN appear on the DATA outputs of phase pattern memory 208 in a predetermined order of succession and at a rate determined by the change in state of PRFG. Since PRFG changes state in synchronism with signal PCLK, it will also be noted that each byte appearing on the DATA outputs of phase pattern memory 208 is in synchronism with PCLK.

The DATA outputs of phase pattern memory 208 are coupled by data bus DM0–DM7 to corresponding inputs of multiplexer 210 which also receives signals RL1–RL2 from decoder 206. If the selected scan line is to the right of the array, signal R/L to decoder 206 will be at a high logic level, whereupon signals RL1–RL2 from decoder 206 are each at a low logic level. In this case, each byte appearing on data bus DM0–DM7 will be unchanged by multiplexer 210, whereupon the byte appears on data bus D0–D7 which is coupled, as previously described, to the element counters and the group counters within the reference generator (reference FIGS. 9A, 9B and 10) and also to corresponding inputs of 32-line decoder 212. If the selected line is to the left of the array, the signal R/L has a low logic level, whereupon the signals RL1–RL2 have various logic levels in order to invert the order of the bits within each byte on data bus DM0–DM7, as described hereinafter. In this case, decoder 206 also responds to the low logic level of signal R/L by inverting, through signal DS, the order in which the bytes within each line block in phase pattern memory 208 are made to appear on the DATA outputs of phase pattern memory 208, as also described hereinafter.

Within each line block in phase pattern memory 208, the information is further organized into a transmit section and a receive section. Within each transmit section, the information comprises: eight element counter bytes (two bits for each element counter); four group counter bytes (four bits for each group counter); and, four slip bytes (one bit for each prescaler). Within each receive section, the information comprises: (initial focal zone), eight element counter bytes, four group counter bytes, and four slip bytes; (first focal zone update), four slip bytes; (second focal zone update), four slip bytes; (third focal zone update), four slip bytes; (fourth focal zone update), four slip bytes; (fifth focal zone update), four slip bytes; (sixth focal zone update), four slip bytes; and (seventh focal zone update), four slip bytes.

In order that the element counter bytes and group counter bytes in the transmit section in each line block may be routed to their corresponding element counters and group counters, decoder 206 provides a signal CLR at the time that the first byte in the transmit section is being selected (by signal DS). Signal CLR clears all of the prescalers, as previously described. Signal CLR also is clocked through successive stages of shift register 204 by signal PCLK so that signals LDP1-LDP8 and LDG1-LDG8 are successively produced by shift register 204 in synchronism with the successive appearance of the eight element counter bytes and the four group counter bytes on data bus DM0-DM7 and data bus D0-D7. Accordingly, the element counters and group counters may be preset for transmit to accordingly preset the steering and focus of the transmitted beam to $\lambda/4$.

After the element counters and group counters have been preset by the element counter and group counter bytes in the transmit section, decoder 206 thereafter selects in sequence (by signal DS) the four slip bytes in the transmit section. Each bit in a slip byte is associated with one of the prescalers and is cleared when that prescaler is to be "slipped" as previously described. In order to route the slip bytes to the corresponding prescalers, signals SG1-SG2 from decoder 206 cause 32-line decoder 212 to store the bits of each slip byte appearing on data bus DM0-DM7 (and thus on data bus D0-D7) in a group of storage locations in decoder 212 that corresponds to the prescalers associated with the slip byte. For example, the bits of the first slip byte will be stored in locations 1-8 of decoder 212. For each slip byte that has been thus stored in decoder 212, decoder 206 provides a STROBE signal to decoder 212 which causes decoder 212 to output the bits of the slip byte as slip signals, e.g., slip signals SL1-SL8, to the associated prescalers for a time substantially equal to one cycle at frequency $8f_0$. Accordingly, each prescaler will be "slipped" or not "slipped" for one cycle at frequency $8f_0$ depending on whether or not the corresponding slip signal has a low logic level to accordingly refine the preset steering and focus of the transmitted beam to $\lambda/8$.

A similar operation takes place for the received beam, in which element counters and group counters are preset with the element counter bytes and group counter bytes in the receive section and in which the prescalers are "slipped" or not "slipped" in accordance with the slip bytes for the initial focal zone. Likewise, the remaining slip bytes in the receive section, in groups of four for each successive focal zone, are selected at predetermined times by decoder 206 (through signal DS) and the bits thereof are routed to the appropriate prescalers to accomplish the first through seventh focal zone updates.

At the beginning of each transmit/receive cycle, decoder 206 operates to address (through signal DS) the bytes in the transmit section in the line block selected by signal LN. When all bytes in the transmit section have been addressed and the bits thereof stored in the appropriate element counters, group counters and prescalers, decoder 206 causes the signal T/$\overline{R}$ to go to a high logic level whereupon beam transmission occurs. If the beam is being steered and focused to the right of the array, the R/L signal is at a high logic level, whereupon decoder 206 detects signal POR to determine when the last group of transducers has been excited. When signal POR has been detected, decoder 206 causes the signal T/$\overline{R}$ to go to a low logic level, thereby terminating transmission, and thereafter selects the bytes within the receive section in the selected line block until all focal zone updates have been accomplished. The transmit/receive cycle is then repeated following the next pulse in signal PL from PRF generator 200, whereupon line number generator 202 selects the next line block in phase pattern memory 208 (through signal LN) and decoder 206 selects, in sequence, the bytes within the transmit and receive sections in that line block. If the beam is being steered and focused to the left of the array, the operation during each transmit/receive cycle is similar. However, decoder 206 now responds to a low logic level in signal R/L to terminate transmission upon detection of signal POL, and also selects the bytes within both the transmit and receive sections in a different order and inverts the order of the bits within the selected bytes (through multiplexer 210) in order to properly route the bits of the selected bytes to the appropriate element counters, group counters, and prescalers.

It will also be noted that the time separation between signals POR and POL can be used to determine the point of origin of the transmitted beam, or time $t_{OR}$, by use of the relationship $$t_{OR} \approx [(t_{POR} - t_{POL})/2]$$

Time $t_{OR}$ can be supplied to the scan converter, by means not illustrated, in order that the scan converter may determine the point of reference of the polar coordinate system represented by the amplitude information in signal A supplied thereto.

Referring also now to FIG. 11, the operation of the controller in FIG. 10 during a single transmit/receive cycle will be described. At the beginning of the transmit/receive cycle, a pulse in signal PL causes line number generator 202 to select, through signal LN, a specific line block x in phase pattern memory 208. Let it be assumed that the selected scan line is to the right of the array, whereby signal R/L (not illustrated in FIG. 11) has a high logic level. In synchronism with each change in state in signal PRFG, decoder 206, through signal DS, selects in sequence the first sixteen bytes in the selected line block in phase pattern memory 208, whereby the eight element counter bytes, the four group counter bytes, and the four slip bytes in the transmit section appear in sequence on data bus DM0-DM7. Since the selected scan line is to the right of the array, multiplexer 210 effects no change in the bytes appearing on data bus DM0-DM7 so that these bytes also appear in sequence on data bus D0-D7. At the time that decoder 206 is selecting, through signal DS, the first byte in the transmit section in the selected line block in phase pattern memory 208, decoder 206 produces a pulse in the signal CLR which thereafter is shifted through the successive stages of shift register 204 by signal PCLK, so that signals LDP1-LDP8 are produced in synchronism with the appearance of the eight element counter bytes on data bus D0-D7 and so that signals LDG1-LDG4 are produced in synchronism with the appearance of the four group counter bytes on data bus D0–D7. Accordingly, the respective bits of the element counter bytes and group counter bytes are stored in the element counters and group counters to preset steering and focusing of the transmitted beam to an accuracy of $\lambda/4$ (at frequency $f_0$) as previously described.

Following production of signal LDG4, signals SG1 and SG2 from decoder 206 remain at a low logic level whereupon the bits of the first slip byte appearing on data bus D0–D7 are stored in the first eight locations in 32-line decoder 212. When the first slip byte has thus been stored, decoder 206 provides the STROBE signal for approximately one cycle of signal CLK, whereupon signals SL1–SL8 are produced by decoder 212 and preset the prescalers associated with transducers X1–X8. Decoder 206 then causes signal SG1 to go to a high logic level but maintains signal SG2 at a low logic level, whereupon the bits in the second slip byte now appearing on data bus D0–D7 are stored in locations 9–16 in decoder 212. When the bits of the second slip byte have thus been stored, decoder 206 provides the STROBE signal for one cycle of signal CLK, whereupon signals SL9–SL16 are produced and preset the prescalers associated with transducers X9–X16. Decoder 206 then causes the signal SG1 to go to a low logic level and the signal SG2 to go to a high logic level, whereupon the bits of the third slip byte now appearing on data bus D0–D7 are stored in locations 17–24 in decoder 212. When the bits of the third slip byte have thus been stored, decoder 206 provides the STROBE signal for one cycle of signal CLK, whereupon signals SL17–SL24 are produced by decoder 212 and preset the prescalers associated with transducers X17–X24. Decoder 206 then causes signal SG1 to go to a high logic level and signal SG2 to remain at a high logic level, whereupon the bits of the fourth slip byte now appearing on data bus D0–D7 are stored in locations 25–32 in decoder 212. When the bits of the fourth slip byte have thus been stored, decoder 206 provides the STROBE signal for one cycle of signal CLK, whereupon signals SL25–SL32 are produced by decoder 212 and preset the prescalers associated with transducers X25–X32.

At this time, steering and focusing of the transmitted beam to $\lambda/8$ accuracy (at frequency $f_0$) has been accomplished, whereupon decoder 206 causes the signal $T/\overline{R}$ to go to a high logic level. As a result, the transmit signals TRn are produced by reference generator 110 so that a burst of ultrasonic energy is emitted by each transducer Xn. Since the selected scan line is to the right of the array, the transducers associated with GROUP8 are excited first so that signal POL is produced shortly after the time that signal $T/\overline{R}$ goes to a high logic level. When the last group of transducers, e.g., GROUP1, is excited, signal POR is produced whereupon decoder 206 returns signal $T/\overline{R}$ to a low logic level to inhibit further transmission.

Thereafter, decoder 206 selects in sequence, through signal DS, the eight element counter bytes, the four group counter bytes, and the four slip bytes in the receive section in the selected line block in phase pattern memory 208 that correspond to the initial focal zone. At the time that the first element counter byte in the receive section is being selected through signal DS, decoder 206 again produces a pulse in signal CLR which is thereafter shifted through the successive stages of shift register 204. The resultant signals LDP1–LDP8 and LDG1–LDG4 accordingly store the bits of the eight element counter bytes and the four group counter bytes in the element counters and group counters. Likewise, decoder 206, through signals DS and SG1–SG2, presets the prescalers in accordance with the bits of the four slip bytes successively appearing on data bus D0–D7. Referring again to FIGS. 9A and 9B, it will be noted that the counts within the element counters and group counters are continuously being incremented during the time that all of the element counters, group counters and prescalers are being preset, e.g., a time equal to sixteen cycles of signal PCLK at frequency $2f_0$. Therefore, it will be appreciated that the counts represented by the element counter bytes and group counter bytes must be modified in an appropriate manner so that all element counters and group counters will contain the correct counts for beam steering and focusing at the time that presetting has been accomplished.

When presetting of the element counters, group counters and prescalers has been accomplished, the scanner begins to process returns of the transmitted ultrasonic energy from object points within a plurality of successive range cells within the initial focal zone, e.g., that focal zone nearest to the array. At predetermined intervals thereafter, decoder 206 causes the scanner to process returns of the transmitted ultrasonic energy from object points within a plurality of successive range cells within seven additional focal zones, each successively further away from the array, by selecting the four slip bytes in each group corresponding to a focal zone in the receive section in phase pattern memory 208 (through signal DS) and by simultaneously controlling signals SG1–SG2 and the STROBE signal so that slip signals SL1–SL32 are developed by decoder 212 and used to "slip" or not "slip" their respective prescalers. When the maximum range has been reached, a pulse is again provided in signal PL from PRF generator 200 and the transmit/receive cycle is repeated for another scan line.

Let it now be assumed that the selected scan line is to the left of the array, and that signal R/L from line number generator 202 accordingly has a low logic level. For purposes of illustration, the eight successive element counter bytes in the transmit section in the line block in phase pattern memory 208 are respectively labeled ECB1, ECB2, ECB3, ECB4, ECB5, ECB6, ECB7, and ECB8, the four successive group counter bytes are respectively labeled GCB1, GCB2, GCB3, and GCB4, and the four successive slip bytes are respectively labeled SB1, SB2, SB3, and SB4. When signal R/L has a low logic level, decoder 206, through signal DS, causes the element counter bytes in the transmit section in the selected line block to be selected in the sequence ECB8, ECB7, ECB6, ECB5, ECB4, ECB3, ECB2, and ECB1. As these element counter bytes successively appear on data bus DM0–DM7, decoder 206, through signals RL1–RL2, causes multiplexer 210 to invert the order of the bits in each byte, e.g., bit B1 in each byte on data bus DM0–DM7 becomes bit B8 on data bus D0–D7, bit B2 in each byte on data bus DM0–DM7 becomes bit B7 on data bus D0–D7, and so forth. Decoder 206 then selects (through signal DS) the four group counter bytes in the transmit section in the selected line block in the sequence GCB4, GCB3, GCB2, and GCB1, and through signals RL1–RL2, causes multiplexer 210 to invert the order of the half-bytes in each byte appearing on data bus DM0–DM7, e.g., bits B1–B4 in each byte appearing on data bus DM0–DM7 become bits B5–B8 on data bus D0–D7 and bits B5–B8 in each byte appearing on data bus DM0–DM7 become bits B1–B4 on data bus D0–D7.

Decoder 206 then selects (through signal DS) the four slip bytes in the transmit section in the selected line block in the sequence SB4, SB3, SB2 and SB1, and through signals RL1-RL2, causes multiplexer 210 to invert the order of the bits in each byte appearing on data bus DM0-DM7, e.g., bit B1 in each byte appearing on data bus DM0-DM7 becomes bit B8 on data bus D0-D7, bit B2 in each byte appearing on data bus DM0-DM7 becomes bit B7 on data bus D0-D7, and so forth. A similar byte and bit inversion is also accomplished for all of the bytes in the receive section in the selected line block. In this manner, the bits of all bits in the line block are routed to the correct element counters, group counters and prescalers.

While the invention has been described with reference to a preferred embodiment, it should be made clear that modifications may be made thereto while still remaining within the spirit and scope of the invention. For example, the signal processing effected by the scanner in the preferred embodiment is asynchronous with the polar-to-rectangular coordinate conversion effected by the scan converter. Typically, such a scan converter effects such conversion by sampling the amplitude information from the scanner (signal A, FIG. 5) at a predetermined rate which is a function of cosine $\theta$, where $\theta$ is the angular displacement of the scan line from a line drawn normal to the array (reference FIG. 1). Changes in the amplitude information in the output from the preferred embodiment of the scanner (the successive values in signal A) occur at a constant rate for all scan lines as determined by the READ SELECT signal (and the SAMPLE signal). In order to synchronize the scanner with the scan converter, all that is required is that the group counters be also clocked at a cosine-corrected rate.

As another example, the frequency of the binary reference signals in the preferred embodiment is identical to that of the transmit signals. As ultrasonic energy propagates through a body, attenuation of higher frequencies occurs, so that a shift in the frequency spectrum of the received electrical signal (FIG. 1A) occurs for object points further away from the array. In order to maximize the response of the scanner to object points that are distant from the array, the frequency of the binary reference signals may be down-shifted in discrete increments for succeeding focal zones and the phase pattern memory may be modified to include a plurality of sets of phase patterns, one for each discrete increment of frequency down-shifting. As yet another example, the resolution window in the preferred embodiment has been chosen to be equal to two cycles at frequency $f_0$, which results in a frequency spectrum of the matched filter that approximates that of the received electrical signal. If desired, the frequency spectrum of the matched filter may be varied by appropriately increasing or decreasing the duration of each resolution window. As a final example, both "real" and "imaginary" signal processing may be handled by the same circuitry, with a consequent reduction in frame rate and/or scan line density, by alternating the application of "real" and "imaginary" binary reference signals during successive transmit/receive cycles to a single set of mixers, by coupling the group summing junctions associated with the single set of mixers to a single capacitor bank through a single set of analog demultiplexers, and by using a single analog mutliplexer to read out the total charge on each capacitor in the capacitor bank so as to provide successive "real" and "imaginary" output signals for the same scan line which can be combined in an appropriate manner. Therefore, it is to be clearly understood that the scope of the invention is to be interpreted only in conjunction with the appended claims.

The embodiments of the invention in which an exclusive property or privilege is claimed are defined as follows:

1. A method for steering and focusing the received beam of an array of ultrasonic transducers to an incremental portion of an object, each transducer being adapted to provide a received signal representing returns of ultrasonic energy from object points of the object, said method comprising the steps of:

providing a plurality of first reference signals, each first reference signal being associated with one of the received signals and having a frequency and phase that are matched to the frequency and phase of those components in the associated received signal that represent returns from object points within said incremental portion;

multiplying each received signal by its associated first reference signal so as to develop a plurality of first product signals each related to the product of a received signal and its associated first reference signal;

integrating each of said plurality of first product signals during an associated one of a plurality of resolution windows, the time occurrence of each said resolution window being substantially equal to the time occurrence of those components in the received signal, from which the associated said first product signal has been developed, that represent returns from object points within said incremental portion, so as to develop a plurality of first correlated signals each related to the time integral of at least one of said plurality of first product signals; and, combining said plurality of first correlated signals so as to develop a first output signal representing a first response of the array to returns from object points within said incremental portion.

2. A method as recited in claim 1, wherein said method is adapted to steer and focus the received beam to each of a plurality of incremental portions of the object, said method further comprising the step of repeating said steps of integrating and combining for each said incremental portion.

3. A method as recited in claim 2, further comprising the step of adjusting the phase of each first reference signal as the received beam is steered and focused to said plurality of incremental portions so that the phase of each first reference signal is matched to the phase of those components in the associated received signal that represent returns from object points within each said incremental portion.

4. A method as recited in claim 1, further comprising the steps of:

providing a plurality of second reference signals, each second reference signal being associated with one of the received signals and having a frequency that is substantially equal to the frequency of the associated first reference signal and a phase that is shifted by 90° from the phase of the associated first reference signal;

multiplying each received signal by its associated second reference signal so as to develop a plurality of second product signals each related to the product of a received signal and its associated second reference signal;

integrating each of said plurality of second product signals during an associated one of said plurality of resolution windows so as to develop a plurality of second correlated signals each related to the time integral of at least one of said plurality of second product signals; and, combining said plurality of second correlated signals so as to develop a second output signal representing a second response of the array to returns from object points within said incremental portion.

5. A method as recited in claim 4, further comprising the step of combining said first output signal and said second output signal to develop a signal representing the amplitude of the returns from object points within said incremental portion.

6. A method as recited in claim 4, further comprising the step of combining said first output signal and said second output signal to develop a signal representing the phase of the returns from object points within said incremental portion.

7. In an ultrasonic beamforming method wherein the electrical signal from each ultrasonic transducer in an array thereof is multiplied by an associated signal whose frequency and phase are related in a predetermined manner to the frequency and phase of the electrical signal in order to develop a product signal related to the product of the electrical signal and its associated reference signal, the improvement comprising the step of integrating each said product signal over a predetermined resolution window whose time duration determines the extent of an incremental portion of an object scanned by the array and whose time occurrence determines the relative location of said incremental portion within the object.

8. An apparatus for steering and focusing the received beam of an array of ultrasonic transducers to an incremental portion of an object, each transducer being adapted to provide a received signal representing returns of ultrasonic energy from object points of the object, said apparatus comprising:

first means for providing a plurality of first reference signals, each first reference signal being associated with one of the received signals and having a frequency and phase that are matched to the frequency and phase of those components in the associated received signal that represent returns from object points within said incremental portion;

second means for multiplying each received signal by its associated first reference signal so as to develop a plurality of first product signals each related to the product of a received signal and its associated first reference signal;

third means for integrating each of said plurality of first product signals during an associated one of a plurality of resolution windows, the time occurrence of each said resolution window being substantially equal to the time occurrence of those components in the received signal, from which the associated first product signal has been developed, that represent returns from object points within said incremental portion, so as to develop a plurality of first correlated signals each related to the time integral of at least one of said plurality of first product signals; and, fourth means for combining said plurality of first correlated signals so as to develop a first output signal representing a first response of the array to returns from object points within said incremental portion.

9. An apparatus as recited in claim 8, further comprising fifth means for combining said plurality of first product signals into a lesser plurality of first group product signals, each first group product signal consisting of those ones of said first plurality of first product signals that have been developed from the received signals from a predetermined number of adjacent transducers in the array; and, wherein said third means is operative to integrate each of said plurality of first group product signals during an associated one of said plurality of resolution windows, so as to develop said plurality of first correlated signals.

10. An apparatus as recited in claim 8, wherein said third means and said fourth means include: a first storage means; and, a first switching means that is selectively controlled to couple each of said plurality of first product signals to said first storage means during the associated resolution window, whereby said plurality of first correlated signals are developed and combined in a signal in said first storage means.

11. An apparatus as recited in claim 10, wherein said fourth means further includes a second switching means that is selectively controlled to read said signal in said first storage means whenever each of said plurality of first product signals has been coupled to said first storage means, so as to develop said first output signal.

12. An apparatus as recited in claim 8, further comprising:

sixth means for providing a plurality of second reference signals, each second reference signal being associated with one of the received signals and having a frequency substantially equal to that of the associated first reference signal and a phase that is shifted by 90° from the phase of the associated first reference signal;

seventh means for multiplying each received signal by its associated second reference signal so as to develop a plurality of second product signals each related to the product of a received signal and its associated second reference signal;

eighth means for integrating each of said plurality of second product signals during an associated one of said plurality of resolution windows, so as to develop a plurality of second correlated signals each related to the time integral of at least one of said plurality of second product signals; and, ninth means for combining said plurality of second correlated signals so as to develop a second output signal representing a second response of the array to returns from object points within said incremental portion.

13. An apparatus as recited in claim 12, further comprising tenth means for combining said plurality of second product signals into a lesser plurality of second group product signals, each second group product signal consisting of those ones of said plurality of second product signals that have been developed from the received signals from a predetermined number of adjacent transducers in the array; and, wherein said eighth means is operative to integrate each of said plurality of second group product signals during an associated one of said plurality of resolution windows, so as to develop said plurality of second correlated signals.

14. An apparatus as recited in claim 12, further comprising means for combining said first output signal and said second output signal to develop a signal representing the amplitude of the returns from object points within said incremental portion.

15. An apparatus as recited in claim 12, further comprising means for combining said first output signal and said second output signal to develop a signal representing the phase of the returns from object points within said incremental portion.

16. An apparatus as recited in claim 12, wherein said eighth means and said ninth means include: a second storage means; and, a third switching means that is selectively controlled to couple each of said plurality of second product signals to said second storage means during the associated resolution window, whereby said plurality of second correlated signals are developed and combined in a signal in said second storage means.

17. An apparatus as recited in claim 16, wherein said ninth means further includes a fourth switching means that is selectively controlled to read said signal in said second storage means whenever each of said plurality of second product signals has been coupled to said second storage means, so as to develop said second output signal.

18. An apparatus as recited in claim 8, wherein said second means includes a plurality of mixers, each said mixer receiving a received signal and its associated first reference signal and being operative to provide one of said plurality of first product signals.

19. An apparatus as recited in claim 18, wherein the first product signal provided by each of said plurality of mixers in said second means is in the form of a current whose magnitude is related to the product of a received signal and its associated first reference signal.

20. An apparatus as recited in claim 19, wherein each said mixer includes an operational transconductance amplifier.

21. An apparatus as recited in claim 19, wherein said third means and said fourth means include: a first capacitance storage means; and, a first switching means that is selectively controlled to couple each of said plurality of first product signals to said first capacitance storage means during the associated resolution window, whereby each of said plurality of first correlated signals is developed as a contribution to the total charge on said first capacitance storage means.

22. An apparatus as recited in claim 21, wherein said fourth means further includes a second switching means that is selectively controlled to develop said first output signal from the total charge on said first capacitance storage means whenever all of said plurality of first product signals have been coupled to said first capacitance storage means by said first switching means.

23. An apparatus, adapted to be used with a plurality of ultrasonic transducers arranged in an array, for processing received signals from the transducers that represent returns of a transmitted burst of ultrasonic energy from object points of an object, so as to form a received beam that is steered and focused to each of a plurality of successive incremental portions of the object, said apparatus comprising:

signal generator means for providing a plurality n of reference signals, each said reference signal being associated with one of the received signals;

means for multiplying each received signal by its associated reference signal so as to develop a plurality n of product signals, each said product signal being related to the product of the instantaneous magnitudes of a received signal and its associated reference signal;

means for combining said plurality n of product signals into a lesser plurality m of group product signals, each said group product signal comprising a current whose magnitude is related to the sum of those ones of said plurality of product signals that have been developed from the received signals provided by a group of adjacent transducers in the array;

a plurality k of capacitance storage means;

switching matrix means adapted to selectively couple each of said plurality m of group product signals to each of said plurality k of capacitance storage means;

readout means adapted to selectively sample the total charge on each of said plurality k of capacitance storage means and to discharge each said capacitance storage means when so sampled; and, wherein said signal generator means is operative to cause said switching matrix means to successively couple each said group product signal to different ones of said plurality k of capacitance storage means during an associated plurality of successive resolution windows, each of whose time occurrence and time duration corresponds to the time occurrence and time duration of those components in the received signals, from which each said group product signal has been developed, that represent returns of ultrasonic energy from object points within a unique one of said plurality of incremental portions, so that a given one of said plurality k of capacitance storage means receives charge contributions from each of said plurality m of group product signals for a unique one of said plurality of incremental portions, and wherein said signal generator means is further operative to cause said readout means to sample the total charge on a given one of said plurality k of capacitance storage means whenever all charge contributions for a unique one of said plurality of incremental portions have been made.

24. An ultrasonic scanner for providing a scanner output signal useful in constructing a real-time, two-dimensional sector image of an object, said scanner comprising:

a plurality of ultrasonic transducers arranged in a linear array;

a transmitter for producing a transmitted beam of ultrasonic energy by exciting said plurality of ultrasonic transducers so that said transducers emit successive bursts of ultrasonic energy, each of which propagates outwardly from the array along a radially-extending scan line;

a processor for steering and focusing a received beam along each said scan line by processing a plurality of received signals from said plurality of ultrasonic transducers that represent returns of each transmitted burst of ultrasonic energy from object points of the object, said processor being operative: to multiply said plurality of received signals by a corresponding plurality of in-phase reference signals and by a corresponding plurality of quadrature reference signals to develop a plurality of in-phase and a plurality of quadrature product signals; to integrate each of said plurality of in-phase product signals and each of said plurality of quadrature product signals over a plurality of resolution windows established by a plurality of select signals, each said resolution window representing the expected time occurrence of returns of the transmitted burst of ultrasonic energy from a unique incremental area of the object along said scan line, so as to develop a plurality of in-phase and a plurality of quadrature correlated signals; and, to successively combine those ones of said plurality of in-phase correlated signals and those ones of said plurality of quadrature product signals that correspond to each incremental area along said scan line so as to respectively provide an in-phase output signal and a quadrature output signal each having a succession of values corresponding to successive incremental areas along said scan line;

means for combining the successive values of said in-phase and quadrature output signals to provide said scanner output signal which has a succession of values each representing the amplitude of returns from object points within a distinct incremental area along said scan line;

a reference generator for providing said plurality of in-phase reference signals, said plurality of quadrature reference signals, and said plurality of select signals, said reference generator being adapted to adjust the relative phasing of said plurality of in-phase reference signals and said plurality of quadrature reference signals and to adjust the relative time occurrences of said plurality of resolution windows established by each of said plurality of select signals in response to information transferred thereto; and, a controller including a phase pattern memory having stored therein a plurality of sets of receive information, each said set comprising the information required to steer said received beam along a unique scan line and to focus said received beam to each of said plurality of incremental areas along said unique scan line, said controller being operative to successively extract, from said phase pattern memory, said plurality of sets of receive information and to successively transfer the thus-extracted sets of receive information to said reference generator.

25. A scanner as recited in claim 24, further comprising means for combining the successive values of said in-phase and said quadrature output signals to provide a second scanner output signal which has a succession of values each representing the phase of returns from object points within a distinct incremental area along said scan line.

* * * * *